（12）United States Patent
Hika et al.

(10) Patent No.: US 11,307,572 B2
(45) Date of Patent: Apr. 19, 2022

(54) INDUSTRIAL VEHICLE REMOTE OPERATION SYSTEM, COMMUNICATION DEVICE, INDUSTRIAL VEHICLE, AND COMPUTER READABLE STORAGE MEDIUM FOR STORING INDUSTRIAL VEHICLE REMOTE OPERATION PROGRAM

(71) Applicant: KABUSHIKI KAISHA TOYOTA JIDOSHOKKI, Kariya (JP)

(72) Inventors: Koji Hika, Kariya (JP); Tadashi Kondo, Kariya (JP); Kuniyoshi Shirai, Kariya (JP); Nobutoshi Kajiya, Kariya (JP); Shinya Goto, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 229 days.

(21) Appl. No.: 16/330,278

(22) PCT Filed: Aug. 29, 2017

(86) PCT No.: PCT/JP2017/030876
§ 371 (c)(1),
(2) Date: Mar. 4, 2019

(87) PCT Pub. No.: WO2018/047671
PCT Pub. Date: Mar. 15, 2018

(65) Prior Publication Data
US 2019/0204822 A1 Jul. 4, 2019

(30) Foreign Application Priority Data
Sep. 6, 2016 (JP) .............................. JP2016-174046

(51) Int. Cl.
*B66F 9/075* (2006.01)
*B66F 9/24* (2006.01)
(Continued)

(52) U.S. Cl.
CPC ....... *G05D 1/0016* (2013.01); *B66F 9/07581* (2013.01); *B66F 9/24* (2013.01);
(Continued)

(58) Field of Classification Search
CPC ........ B66F 9/07581; B66F 9/24; G08C 17/02; G08C 2201/40; G08C 2201/93; G05D 1/0016; G05D 1/0022; G05D 2201/0216
(Continued)

(56) References Cited

U.S. PATENT DOCUMENTS

| 2017/0011637 | A1* | 1/2017 | Woicekowski | ...... G06Q 10/109 |
| 2017/0019480 | A1* | 1/2017 | Yokota | ................... B60R 25/257 |
| 2019/0230522 | A1* | 7/2019 | Sugaya | ............. H04W 72/0473 |

FOREIGN PATENT DOCUMENTS

| JP | 2002-104800 A | 4/2002 |
| JP | 2010-178032 A | 8/2010 |

(Continued)

OTHER PUBLICATIONS

International Search Report for PCT/JP2017/030876 dated Nov. 21, 2017 [PCT/ISA/210].

*Primary Examiner* — Abby Y Lin
*Assistant Examiner* — Hossam M Abd El Latif
(74) *Attorney, Agent, or Firm* — Sughrue Mion, PLLC

(57) ABSTRACT

An industrial vehicle remote operation system includes an industrial vehicle including a vehicle communication portion, a communication device, and, a first signal conversion portion. The communication device includes a reception portion that receives two or more types of operation signals, an obtainment portion that obtains a conversion program for converting the operation signal into the remote instruction signal, a storage portion configured to store the conversion program, a second signal conversion portion configured to convert the operation signal into the remote instruction
(Continued)

signal using the conversion program, and a communication device communication portion that sends the remote instruction signal to the vehicle communication portion. The communication device includes an update portion configured to update information stored in the storage portion so as to enable addition, deletion, or change of one or more of the operation signals that are convertible by the second signal conversion portion.

15 Claims, 8 Drawing Sheets

(51) Int. Cl.
*G05D 1/00* (2006.01)
*G08C 17/02* (2006.01)

(52) U.S. Cl.
CPC ........... *G05D 1/0022* (2013.01); *G08C 17/02* (2013.01); *G05D 2201/0216* (2013.01); *G08C 2201/40* (2013.01); *G08C 2201/93* (2013.01)

(58) Field of Classification Search
USPC .......................................................... 701/50
See application file for complete search history.

(56) References Cited

FOREIGN PATENT DOCUMENTS

| | | | | |
|---|---|---|---|---|
| JP | 2010178032 | A | * | 8/2010 |
| JP | 2015-070463 | A | | 4/2015 |
| JP | 2015070463 | A | * | 4/2015 |
| JP | 2015-226094 | A | | 12/2015 |

* cited by examiner

INDUSTRIAL VEHICLE REMOTE OPERATION SYSTEM, COMMUNICATION DEVICE, INDUSTRIAL VEHICLE, AND COMPUTER READABLE STORAGE MEDIUM FOR STORING INDUSTRIAL VEHICLE REMOTE OPERATION PROGRAM

CROSS REFERENCE TO RELATED APPLICATIONS

This application is a National Stage of International Application No. PCT/JP2017/030876, filed on Aug. 29, 2017, which claims priority from Japanese Patent Application No. 2016-174046, filed on Sep. 6, 2016.

TECHNICAL FIELD

The present invention relates to an industrial vehicle remote operation system, a communication device, an industrial vehicle, and a computer-readable storage medium for storing an industrial vehicle remote operation program.

BACKGROUND ART

Patent Document 1 describes a remote controller that is used as a communication device for remote operation of a forklift, which is an industrial vehicle. The remote controller uses a remote operation means, which serves as an operation controller, to remotely control the cargo handling operation of a forklift from a position that is separated from the forklift.

PRIOR ART DOCUMENT

Patent Document

Patent Document 1: Japanese Laid-Open Patent Publication No. 2002-104800

SUMMARY OF THE INVENTION

Problems that the Invention is to Solve

For convenience reasons, the operator who remotely operates an industrial vehicle may want to use a plurality of types of operation controllers according to the remote operation mode. Further, there may be situations where the operator wants to add a new operation controller for remote operation that differs in type from the operation controller currently used.

It is an objective of the present invention to provide an industrial vehicle remote operation system, a communication device, an industrial vehicle, and a computer-readable storage medium for storing an industrial vehicle remote operation program that have improved convenience.

Means for Solving the Problems

In accordance with a first aspect of the present disclosure, an industrial vehicle remote operation system is provided that includes an industrial vehicle including a vehicle communication portion and a communication device configured to be used for remote operation of the industrial vehicle. The industrial vehicle includes a first signal conversion portion configured to convert a remote instruction signal of a predetermined data format into a control signal of a data format different from the data format of the remote instruction signal. The industrial vehicle is configured to operate based on the control signal converted by the first signal conversion portion. The communication device includes a reception portion configured to receive an operation signal, which is output by an operation controller, an obtainment portion configured to obtain a conversion program for converting the operation signal into the remote instruction signal, a storage portion configured to store the conversion program, a second signal conversion portion configured to convert the operation signal into the remote instruction signal using the conversion program stored in the storage portion, and a communication device communication portion configured to send the remote instruction signal to the vehicle communication portion. The reception portion is configured to receive a plurality of types of operation signals that are output by a plurality of types of operation controllers and have different data formats. The communication device includes an update portion configured to update information stored in the storage portion so as to enable addition, deletion, or change of one or more of the operation signals that are convertible by the second signal conversion portion.

In accordance with a second aspect of the present disclosure, a communication device is provided that includes a vehicle communication portion configured to receive a remote instruction signal of a predetermined data format and a first signal conversion portion configured to convert the remote instruction signal into a control signal of a data format different from the data format of the remote instruction signal. The communication device is configured to be used for remote operation of an industrial vehicle that operates based on the control signal converted by the first signal conversion portion. The communication device further includes a reception portion configured to receive an operation signal, which is output by an operation controller, an obtainment portion configured to obtain a conversion program, which converts the operation signal into the remote instruction signal, a storage portion configured to store the conversion program, a second signal conversion portion configured to convert the operation signal into the remote instruction signal using the conversion program stored in the storage portion, and a communication device communication portion configured to send the remote instruction signal to the vehicle communication portion. The reception portion is configured to receive a plurality of types of operation signals that are output by a plurality of types of operation controllers and have different data formats. The communication device includes an update portion configured to update information stored in the storage portion so as to enable addition, deletion, or change of one or more of the operation signals that are convertible by the second signal conversion portion.

In accordance with a third aspect of the present disclosure, an industrial vehicle configured to operate based on a control signal is provided. The industrial vehicle includes a reception portion configured to receive an operation signal, which is output by an operation controller, an obtainment portion configured to obtain a control conversion program, which converts the operation signal into the control signal, a storage portion configured to store the control conversion program, and a signal conversion portion configured to convert the operation signal into the control signal using the control conversion program stored in the storage portion. The reception portion is configured to receive a plurality of types of operation signals that are output by a plurality of types of operation controllers and have different data formats. The industrial vehicle includes an update portion configured to update information stored in the storage portion so as to enable addition, deletion, or change of one or more of the operation signals that are convertible by the signal conversion portion.

In accordance with a fourth aspect of the present disclosure, a computer-readable medium is provided that stores an industrial vehicle remote operation program used for an industrial vehicle remote operation by a communication device. The industrial vehicle includes a vehicle communication portion configured to receive a remote instruction signal of a predetermined data format, and a first signal conversion portion configured to convert the remote instruction signal into a control signal of a data format different from the data format of the remote instruction signal. The industrial vehicle is configured to operate based on the control signal converted by the first signal conversion portion. The communication device includes a reception portion configured to receive an operation signal, which is output by an operation controller, a storage portion configured to store a conversion program for converting the operation signal into the remote instruction signal, a communication device communication portion configured to communicate with the vehicle communication portion, and a second signal conversion portion configured to convert the operation signal into the remote instruction signal. The industrial vehicle remote operation program includes instructions for executing, using the communication device, processes of: causing the second signal conversion portion to convert the operation signal into the remote instruction signal using the conversion program stored in the storage portion; instructing the communication device communication portion to send the remote instruction signal to the vehicle communication portion; and updating information stored in the storage portion so as to enable addition, deletion, or change of an operation signal that is convertible by the second signal conversion portion.

MODES FOR CARRYING OUT THE INVENTION

First Embodiment

An industrial vehicle remote operation system 10 according to a first embodiment will now be described.

Figure 1:
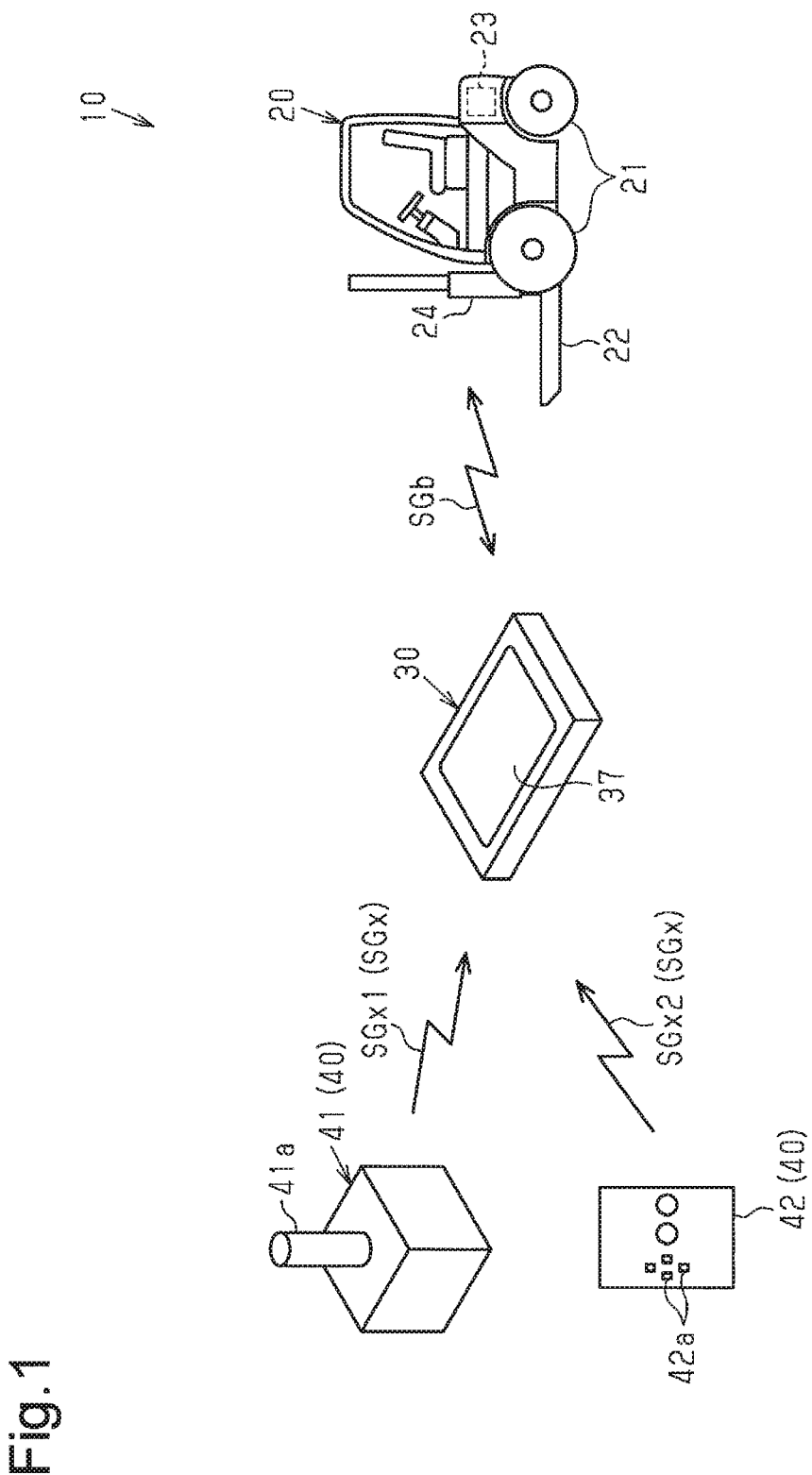
FIG. 1 is a schematic view showing an industrial vehicle remote operation system of a first embodiment.
Figure 2:
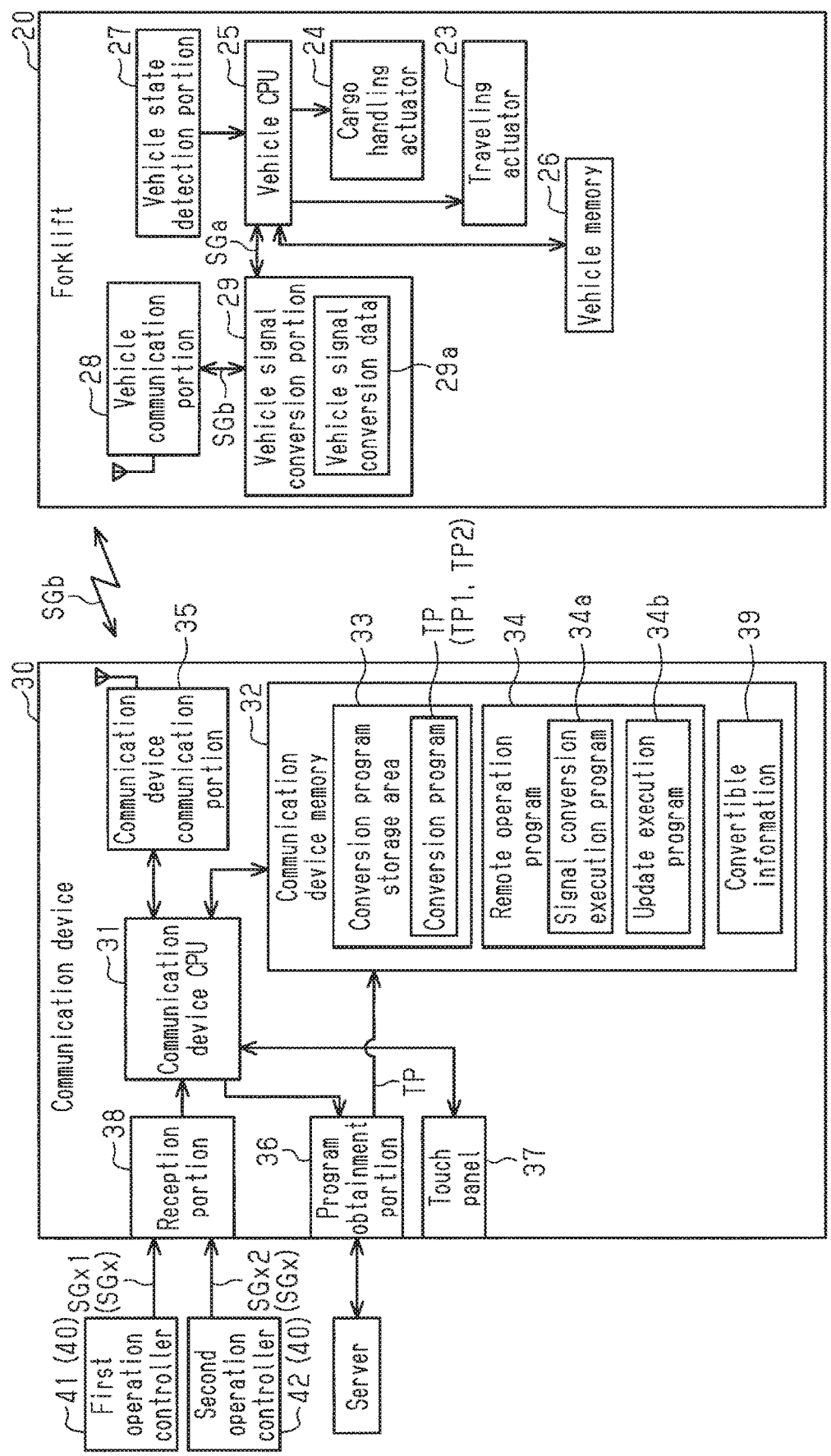
FIG. 2 is a block diagram schematically showing the electrical structure of the industrial vehicle remote operation system.

As shown in FIGS. 1 and 2, the industrial vehicle remote operation system 10 includes a forklift 20, which serves as an industrial vehicle, a communication device 30 used for remote operation of the forklift 20, and operation controllers 40.

As shown in FIG. 1, the forklift 20 includes wheels 21 and forks 22, which serve as a cargo handling device and move in the up-down direction to lift or lower cargos. The forklift 20 of the present embodiment is configured to be operable by a driver who is seated in the forklift 20.

The forklift 20 may be an engine forklift, which has an engine, an electric vehicle (EV), which has a power storage unit and an electric motor, or a fuel cell vehicle (FCV), which has a fuel cell and an electric motor. Further, the forklift 20 may be a hybrid vehicle (HV), which includes an engine, a power storage unit, and an electric motor.

As shown in FIG. 2, the forklift 20 includes a traveling actuator 23, a cargo handling actuator 24, a vehicle CPU 25, which controls the traveling actuator 23 and the cargo handling actuator 24, a vehicle memory 26, and a vehicle state detection portion 27.

The traveling actuator 23 is used for traveling of the forklift 20. The traveling actuator 23 rotates the wheels 21 and changes the traveling direction. When the forklift 20 is an engine forklift, the traveling actuator 23 is an engine. When the forklift 20 is an EV, the traveling actuator 23 is an electric motor for rotating the wheels 21.

The cargo handling actuator 24 drives the forks 22. For example, the cargo handling actuator 24 includes a cargo handling motor and a mechanism that moves the forks 22 in the up-down direction using the driving force of the cargo handling motor.

The vehicle CPU 25 is configured to receive control signals SGa. When a control signal SGa is input to the vehicle CPU 25, the vehicle CPU 25 reads and executes a control program stored in the vehicle memory 26 to control the traveling actuator 23 and the cargo handling actuator 24. The vehicle central processing unit (CPU) 25 can also be referred to as a vehicle ECU or a vehicle micro processing unit (MPU).

The data format of the control signal SGa is predetermined based on the controller area network (CAN) standard, for example. That is, in the present embodiment, the control signal SGa is a CAN signal. The data format can also be referred to as a signal form, a data structure, or a signal format.

The control signal SGa includes control information related to at least one of the traveling mode and the cargo handling mode of the forklift 20. The traveling mode of the forklift 20 may include information on forward movement, backward movement, stopping, traveling speed, and steering angle of the forklift 20, for example. The cargo handling mode may include information on whether to operate the forks 22 and information on lifting or lowering of the forks 22. Based on the control signal SGa, the vehicle CPU 25 controls the traveling actuator 23 and the cargo handling actuator 24 to drive the forklift 20 in the mode corresponding to the control signal SGa.

The control signal SGa is in the predetermined data format regardless of specific control modes of the traveling actuator 23 and the cargo handling actuator 24. On the other hand, depending on the specific control mode, the control signal SGa varies in data content (control information), which is in the predetermined data format.

The vehicle state detection portion 27 is configured to detect the state of the forklift 20. The vehicle state detection portion 27 may detect whether the forklift 20 operates normally or abnormally and output the detection result to the vehicle CPU 25. This allows the vehicle CPU 25 to determine the state of the forklift 20.

The detection target of the vehicle state detection portion 27 is not limited to any abnormality of the forklift 20 and may be set freely. For example, the detection target may be information such as the traveling speed or the position of the forks 22.

As shown in FIG. 2, the forklift 20 includes a vehicle communication portion 28, which communicates with the communication device 30, and a vehicle signal conversion portion 29, which converts signals. The vehicle signal conversion portion 29 corresponds to a first signal conversion portion. The communication device 30 is a communication terminal with a communication function and may be a device such as a smartphone, a tablet terminal, or a mobile communication device.

The vehicle communication portion 28 is configured to exchange signals with the communication device 30, which is separated from the forklift 20. The vehicle communication portion 28 receives remote instruction signals SGb, which are output by the communication device 30, and transmits detection transmission signals, which relate to vehicle information, to the communication device 30.

The remote instruction signal SGb has a data format different from that of the control signal SGa. In the present embodiment, the remote instruction signal SGb includes identification information, which indicates that the signal is a remote instruction signal SGb, and remote operation data, which relates to the operation of the forklift 20.

The remote operation data may include traveling information and cargo handling information. The traveling information may include information on forward movement, backward movement, and stopping, information on a traveling speed, and information on a steering angle. The cargo handling information may include information on lifting, lowering, and stopping of the forks 22 and information on an amount of movement in the up-down direction. However, the specific data configuration of the remote operation data is not limited to the above and may be set freely.

Based on the identification information of the signal received by the vehicle communication portion 28, the vehicle signal conversion portion 29 identifies that the received signal is a remote instruction signal SGb. When identifying that the received signal is a remote instruction signal SGb, the vehicle signal conversion portion 29 converts the remote instruction signal SGb into a control signal SGa and outputs this control signal SGa to the vehicle CPU 25. Specifically, the vehicle signal conversion portion 29 has vehicle signal conversion data 29a, which contains the correlation between remote instruction signals SGb and control signals SGa. The vehicle signal conversion portion 29 refers to this vehicle signal conversion data 29a and derives the control signal SGa that is associated with the remote instruction signal SGb received by the vehicle communication portion 28.

Figures 3, 4:
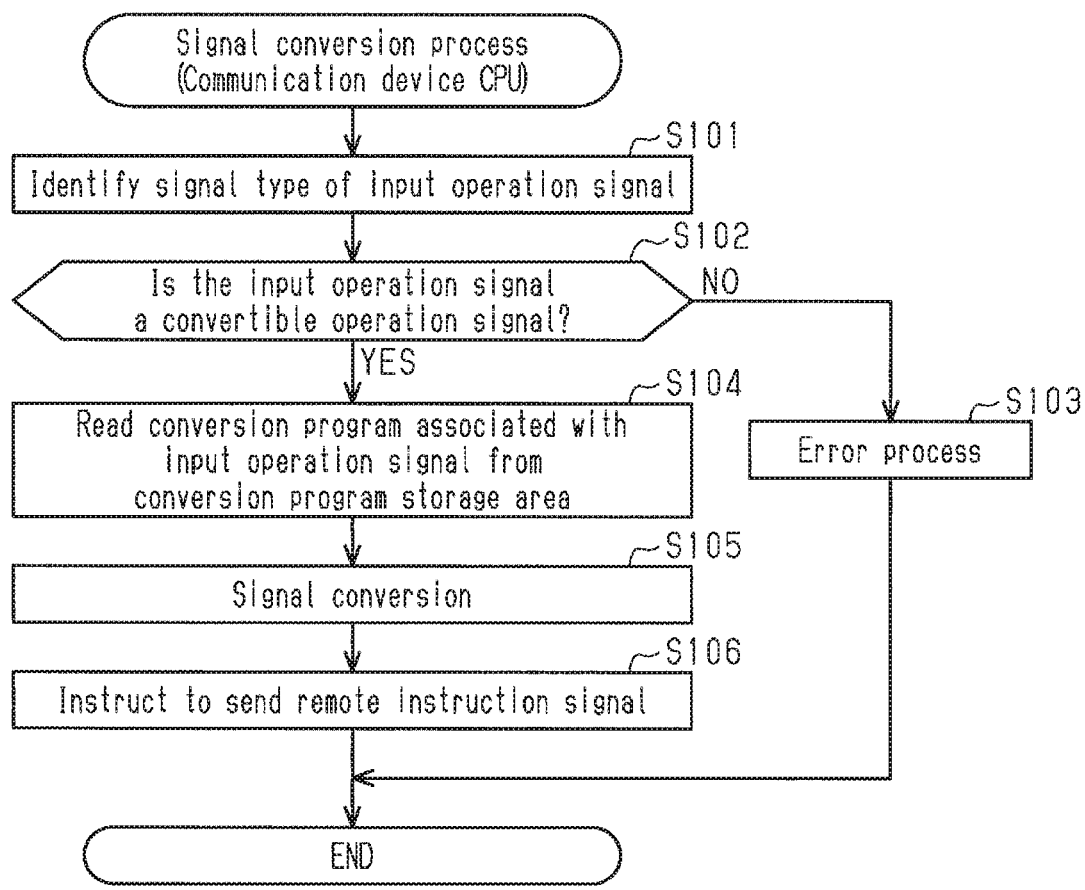
FIG. 3 is a schematic view showing vehicle signal conversion data.
FIG. 4 is a flowchart of a signal conversion process.

As shown in FIG. 3, in the vehicle signal conversion data 29a, control signals SGa(1), SGa(2), . . . , SGa(n) are associated with the respective remote instruction signals SGb(1), SGb(2), . . . , SGb(n), which are identical in data format but vary in data content, specifically, in the content of remote operation data. The control signals SGa(1), SGa(2), . . . , SGa(n) are identical in data format but vary in data content (control information). The data content of each of the control signals SGa(1), SGa(2), . . . , SGa(n) is associated with the data content of a corresponding one of the remote instruction signals SGb(1), SGb(2), . . . , SGb(n). For example, a remote instruction signal SGb(k) corresponding to forward movement is associated with a control signal SGa(k) corresponding to forward movement, and a remote instruction signal SGb(m) corresponding to stopping is associated with a control signal SGa(m) corresponding to stopping. Further, a remote instruction signal SGb(v) corresponding to a specific traveling speed is associated with a control signal SGa(v) corresponding to this specific traveling speed.

The vehicle signal conversion portion 29 refers to the vehicle signal conversion data 29a to derive the control signal SGa that is associated with the received remote instruction signal SGb. The remote instruction signal SGb is thus converted into a control signal SGa.

Since the remote instruction signal SGb differs from the control signal SGa in data format, the vehicle signal conversion portion 29 can be considered as a means for converting a remote instruction signal SGb into a control signal SGa of a data format different from the data format of the remote instruction signal SGb.

The vehicle CPU 25 thus receives the control signal SGa associated with the remote instruction signal SGb received by the vehicle communication portion 28. This allows the traveling actuator 23 and the cargo handling actuator 24 to drive based on the control signal SGa associated with the remote instruction signal SGb. As such, the forklift 20 operates according to the data content of the remote instruction signal SGb.

The data format of signals exchanged between various electronic devices in the forklift 20 is identical with the data format of the control signal SGa. As such, the data format of the control signal SGa can be considered as the data format of the signals exchanged between the various devices in the forklift 20. In this respect, the vehicle signal conversion portion 29 can be considered as a means for converting remote instruction signals SGb, which have an exterior communication data format, into control signals SGa, which have an interior communication data format.

When receiving a control signal SGa, the vehicle CPU 25 identifies this control signal SGa and operates according to it. However, the vehicle CPU 25 does not operate when receiving a remote instruction signal SGb as it is. As such, the vehicle signal conversion portion 29 can be considered as a means that converts remote instruction signals SGb into control signals SGa with which the vehicle CPU 25 can operate, in other word, control signals SGa that are identifiable by the vehicle CPU 25.

The vehicle CPU 25 outputs to the vehicle signal conversion portion 29 a detection result signal that includes information on the detection result of the vehicle state detection portion 27. The detection result signal may be a CAN signal, for example. The vehicle signal conversion portion 29 converts the detection result signal, which is input from the vehicle CPU 25, into a detection transmission signal. The detection transmission signal has a data format that is suitable for the communication of the vehicle communication portion 28, specifically, the communication between the vehicle communication portion 28 and a communication device communication portion 35. The vehicle communication portion 28 transmits the detection transmission signal to the communication device 30, specifically, the communication device communication portion 35.

Further, the vehicle CPU 25 uses the vehicle communication portion 28 to send information on the standard (specifications) of the forklift 20 to the communication device 30. This allows the communication device 30 to identify the standard of the forklift 20. The standard of the forklift 20 may include the possible traveling speed, for example.

As shown in FIG. 2, the communication device 30 includes a communication device CPU 31, a communication device memory 32, a communication device communication portion 35, a program obtainment portion 36, a touch panel 37, and a reception portion 38.

The communication device CPU 31 is configured to perform various processes using various programs stored in the communication device memory 32. The communication device CPU 31 is electrically connected to the communication device communication portion 35 and the reception portion 38 so as to exchange signals with the communication device communication portion 35 and the reception portion 38.

The communication device memory 32 includes a conversion program storage area 33, which stores conversion programs TP used for converting operation signals SGx into remote instruction signals SGb, and a remote operation program 34, which is used for remote operation of the forklift 20. The conversion program storage area 33 may be a readable and writable RAM or a flash memory. The conversion program storage area 33 corresponds to a storage portion, and the remote operation program 34 corresponds to an industrial vehicle remote operation program. The communication device memory 32 corresponds to a computer-readable storage medium, which stores the industrial vehicle remote operation program. The computer-readable storage medium may be any storage medium that stores various computer programs in any form such as electronic, magnetic, optical, or electromagnetic form. The computer-readable storage medium may include a non-transitory computer-readable storage medium.

The remote operation program 34 includes a signal conversion execution program 34a, which causes the communication device CPU 31 to perform a signal conversion process, and an update execution program 34b, which causes the communication device CPU 31 to perform a conversion program update process. These programs are described below. The remote operation program 34 includes instructions for performing various processes using the communication device 30.

The communication device communication portion 35 is configured to exchange signals with the vehicle communication portion 28. In the present embodiment, the communication device communication portion 35 communicates wirelessly with the vehicle communication portion 28, allowing the communication device 30 and the forklift 20 to exchange signals between each other. The communication system used between the vehicle communication portion 28 and the communication device communication portion 35 may be any system such as Bluetooth (registered trademark), Zigbee (registered trademark), or Wi-Fi, for example.

In the present embodiment, the remote instruction signal SGb conforms to the wireless communication system used between the communication device communication portion 35 and the vehicle communication portion 28. Specifically, the data format of the remote instruction signal SGb is set in conformance to the standard of the wireless communication between the communication device communication portion 35 and the vehicle communication portion 28.

The program obtainment portion 36 is used to obtain conversion programs TP. The program obtainment portion 36 is configured to access a server that stores conversion programs TP via the Internet, for example, and obtain a desired conversion program TP by accessing the server. However, the specific configuration of the program obtainment portion 36 is not limited to this configuration and may be set freely. For example, the program obtainment portion 36 may be a reader or an interface capable of reading a storage medium that stores conversion programs TP. The program obtainment portion 36 corresponds to an obtainment portion.

The touch panel 37 includes a display screen with a touch sensor. The touch panel 37 outputs to the communication device CPU 31 a signal related to an operation (touch) on the touch panel 37. This allows the communication device CPU 31 to identify whether the touch panel 37 is operated, for example, whether an icon is touched when the touch panel 37 displays icons.

Further, the communication device CPU 31 controls the display of the touch panel 37. For example, when the communication device communication portion 35 receives a detection transmission signal, the communication device CPU 31 identifies the vehicle state based on the detection transmission signal and displays information about the vehicle state on the touch panel 37. This allows the operator to identify the vehicle state (e.g., any abnormality and the traveling speed) based on the display on the touch panel 37. However, the indication of the vehicle state is not limited to the display on the touch panel 37 and may be in any form.

The reception portion 38 is configured to receive operation signals SGx, which are output by operation controllers 40. The reception portion 38 is configured to be connectable to the operation controllers 40 via wired communication or wireless communication. The connection between the reception portion 38 and the operation controllers 40 allows operation signals SGx to be input from the operation controllers 40 to the reception portion 38. In addition, the reception portion 38 receives a plurality of types of operation signals SGx of different data formats. That is, the reception portion 38 can also be described as an interface connected to a plurality of types of operation controllers 40.

Each of the operation controllers 40 is a general-purpose controller usable also for applications other than remote operation of the forklift 20, and may be a controller of a game machine, a tablet terminal, or a voice recognition terminal, for example. The operation controllers 40 include a first operation controller 41, which outputs first operation signals SGx1 of a first data format, and a second operation controller 42, which outputs second operation signals SGx2 of a second data format.

The first operation controller 41 may include a tiltable lever 41a and outputs a first operation signal SGx1 according to the tilt direction and the tilt angle of the lever 41a. The first operation signal SGx1 is an operation signal SGx that has the first data format associated with the first operation controller 41, and the data content of the first operation signal SGx1 varies depending on the operation mode. The first operation signal SGx1 may include identification information, which indicates that the signal is a first operation signal SGx1, tilt direction information, which relates to the tilt direction of the lever 41a, and tilt angle information, which relates to the tilt angle of the lever 41a.

The data format of the first operation signal SGx1 is the same regardless of the operation mode of the first operation controller 41. That is, regardless of the operation mode of the first operation controller 41, the first operation signal SGx1 includes the identification information, tilt direction information, and tilt angle information.

On the other hand, the data content of the first operation signal SGx1 varies depending on the operation mode of the first operation controller 41. That is, depending on the operation mode of the first operation controller 41, the contents of the tilt direction information and the tilt angle information of the first operation signal SGx1 vary. The first data format can be considered as a data format that is unique to the first operation controller 41 and determined by the operation mode of the first operation controller 41.

The second operation controller 42 may be a portable terminal having operation buttons 42a, for example. The second operation controller 42 outputs a second operation signal SGx2 according to the operation mode of the operation buttons 42a. The second operation signal SGx2 is an operation signal SGx that has the second data format associated with the second operation controller 42, and the data content of the second operation signal SGx2 varies depending on the operation mode. Specifically, when the second operation controller 42 has operation buttons 42a including a traveling button relating to traveling and a cargo handling button relating to cargo handling, for example, a second operation signal SGx2 includes identification information, which indicates that the signal is a second operation signal SGx2, traveling operation information, which relates to the operation mode of the traveling button, and cargo handling operation information, which relates to the operation mode of the cargo handling button.

The data format of the second operation signal SGx2 is the same regardless of the operation mode of the second operation controller 42. That is, regardless of the operation mode of the second operation controller 42, the second operation signal SGx2 includes the identification information, traveling operation information, and cargo handling operation information.

On the other hand, the data content of the second operation signal SGx2 varies depending on the operation mode of the second operation controller 42. That is, depending on the operation mode of the second operation controller 42, the contents of the traveling operation information and the cargo handling operation information of the second operation signal SGx2 vary. The second data format can be considered as a data format that is unique to the second operation controller 42 and determined by the operation mode of the second operation controller 42.

The operation controllers 41 and 42 output operation signals SGx1 and SGx2 of the data formats that are unique to the respective operation controllers 41 and 42. The operation controllers 41 and 42 differ in operation method. Thus, the operation signals SGx1 and SGx2 differ in data format. That is, the operation signals SGx1 and SGx2 contain different types of data. The first operation signal SGx1 includes the tilt direction information and the tilt angle information, whereas the second operation signal SGx2 includes the traveling operation information and the cargo handling operation information. In other words, operation signals SGx can be considered as having different data formats when the operation signals SGx contain data of different types and volumes. The first and second operation signals SGx1 and SGx2 are operation signals SGx that contain data of different types.

As shown in FIG. 2, in the present embodiment, the reception portion 38 is configured to be connected simultaneously to a plurality of types of operation controllers 41 and 42 via wired or wireless communication. When connected to the different types of the operation controllers 41 and 42 simultaneously, the reception portion 38 may receive both operation signals SGx1 and SGx2. Specifically, when the first operation controller 41 is operated, a first operation signal SGx1 is output by the first operation controller 41 and input to the reception portion 38. When the second operation controller 42 is operated, a second operation signal SGx2 is output by the second operation controller 42 and input to the reception portion 38.

When the two operation controllers 41 and 42 are connected to the reception portion 38 by wires, specifically, signal lines, the reception portion 38 is a plurality of connectors (e.g., two connectors) to which the signal lines are connected. Alternatively, when the two operation controllers 41 and 42 are connected to the reception portion 38 via wireless communication, the reception portion 38 is a receiver that receives operation signals SGx1 and SGx2. In this case, the wireless communication system used between the operation controllers 40 and the reception portion 38 may be any system such as Bluetooth (registered trademark), Zigbee (registered trademark), or Wi-Fi, for example.

The communication system of first operation signals SGx1, which is used between the first operation controller 41 and the reception portion 38, may be identical with or different from the communication system of second operation signals SGx2, which is used between the second operation controller 42 and the reception portion 38. For example, when the two operation controllers 41 and 42 are connected to the reception portion 38 via wireless communication, the communication system of both of the operation signals SGx1 and SGx2 may be Bluetooth (registered trademark). Alternatively, the communication system of the first operation signal SGx1 may be Bluetooth (registered trademark), and the communication system of the second operation signal SGx2 may be Zigbee (registered trademark). In this case, the reception portion 38 preferably includes a first reception portion, which supports the communication system of the first operation signal SGx1 and receives the first operation signal SGx1, and a second reception portion, which supports the communication system of the second operation signal SGx2 and receives the second operation signal SGx2.

Even when the operation signals SGx1 and SGx2 are identical in communication system, the signals may have different data formats. For example, even when the communication system of both of the operation signals SGx1 and SGx2 is Bluetooth (registered trademark), the first operation controller 41 may output a first operation signal SGx1 of a data format corresponding to the SPP profile, and the second operation controller 42 may output a second operation signal SGx2 of a data format corresponding to the HID profile. Other data formats that are available when Bluetooth (registered trademark) is used include a data format corresponding to the HSP profile, a data format corresponding to the A2DP profile, and a data format corresponding to the HFP profile.

That is, the data format of the operation signal SGx concerns only the type of data determined by the operation method of the operation controller 40. The communication system of the operation signal SGx is irrelevant to the data format of the operation signal SGx.

In the present embodiment, the communication range between the communication device communication portion 35 and the vehicle communication portion 28 is larger than the communication range between the operation controllers 40 and the communication device 30 (the reception portion 38). However, the communication range between the communication device communication portion 35 and the vehicle communication portion 28 may be the same as or smaller than the communication range between the operation controllers 40 and the communication device 30. The communication range is defined by the length of the wiring when wired communication is used. With wireless communication, the communication range is the range in which communication is possible.

The reception portion 38 receives an operation signal SGx and outputs it to the communication device CPU 31. This allows the communication device CPU 31 to identify what type of operation signal SGx is input.

The communication device CPU 31 is configured to, when the reception portion 38 receives an operation signal SGx, read the signal conversion execution program 34a stored in the communication device memory 32 and execute a signal conversion process based on the signal conversion execution program 34a. The signal conversion process converts the operation signal SGx into a remote instruction signal SGb using a conversion program TP stored in the conversion program storage area 33 and sends the remote instruction signal SGb to the vehicle communication portion 28. The signal conversion execution program 34a can be considered as a program for causing the communication device CPU 31 to perform a signal conversion process.

In the present embodiment, the communication device CPU 31, which performs the signal conversion process, corresponds to a second signal conversion portion, and the signal conversion execution program 34a corresponds to a program for causing the communication device 30 to function as the second signal conversion portion and the transmission instruction portion.

Referring to FIG. 4, the signal conversion process is now described.

As shown in FIG. 4, at step S101, the communication device CPU 31 identifies the signal type of the operation signal SGx that is input to the reception portion 38 (hereinafter referred to as an input operation signal SGxx). Specifically, the communication device CPU 31 identifies the identification information of the input operation signal SGxx. The input operation signal SGxx can be considered as an operation signal SGx received by the reception portion 38.

At step S102, the communication device CPU 31 determines whether the input operation signal SGxx is a convertible operation signal SGx. Specifically, as shown in FIG. 2, the communication device memory 32 stores convertible information 39 for identification of convertible operation signals SGx. The convertible information 39 contains operation signals SGx that are convertible into remote instruction signals SGb using the conversion programs TP currently stored in the conversion program storage area 33.

The convertible operation signals SGx are associated with the usable operation controllers 40. Thus, the convertible information 39 can be considered as information used to identify the operation controllers 40 that are currently usable.

In the initial state, the communication device 30 of the present embodiment is configured to convert both of first and second operation signals SGx1 and SGx2 into remote instruction signals SGb. Specifically, in the initial state, the conversion program storage area 33 stores a first conversion program TP1, which converts first operation signals SGx1 into remote instruction signals SGb, and a second conversion program TP2, which converts second operation signals SGx2 into remote instruction signals SGb. Thus, in the initial state, the convertible information 39 includes the first and second operation signals SGx1 and SGx2. In other words, the initial convertible information 39 includes the first and second operation controllers 41 and 42 as usable operation controllers 40.

Referring to the convertible information 39, the communication device CPU 31 identifies the convertible operation signals SGx and determines whether the input operation signal SGxx is included in the convertible operation signals SGx. Specifically, the communication device CPU 31 compares the identification information of the input operation signal SGxx and the convertible information 39 to determine whether the input operation signal SGxx is included in the convertible operation signals SGx.

When the input operation signal SGxx is not included in the convertible operation signals SGx, the communication device CPU 31 determines that the input operation signal SGxx is inconvertible. In this case, the communication device CPU 31 performs an error process at step S103 and ends this signal conversion process. The error process may be displaying on the touch panel 37 that the operation controller 40 associated with the input operation signal SGxx is not currently usable and that a conversion program update process is required. The conversion program update process is described below.

When the input operation signal SGxx is included in the convertible operation signals SGx, the input operation signal SGxx is convertible into a remote instruction signal SGb without updating the conversion programs TP. In this case, the communication device CPU 31 proceeds to step S104 and reads the conversion program TP associated with the input operation signal SGxx from the conversion program storage area 33.

The conversion programs TP are now described. In the present embodiment, each conversion program TP includes information required to generate a remote instruction signal SGb from an operation signal SGx.

The first conversion program TP1 is a conversion program TP that is used to convert a first operation signal SGx1 into a remote instruction signal SGb. The first conversion program TP1 may include a first extraction program, which extracts the data content of the first operation signal SGx1, and a first derivation program, which derives the data content of the remote operation data from the extracted data content of the first operation signal SGx1.

The first derivation program is configured so that the data content of the first operation signal SGx1 corresponds to the data content of the remote operation data. For example, the data content of remote operation data relating to a traveling speed is set such that the traveling speed of the forklift 20 is higher when the tilt angle of the lever 41a in the tilt angle information of the first operation signal SGx1 is larger. A remote instruction signal SGb is thus generated according to the operation mode of the first operation controller 41.

Further, the communication device CPU 31 may derive a remote instruction signal SGb based on the data content of the first operation signal SGx1 and the standard of the forklift 20. For example, when the traveling speed in the remote operation data derived by the first derivation program is higher than the maximum speed specified by the standard of the forklift 20 to be remotely operated, the communication device CPU 31 may update the remote operation data such that the traveling speed is set to the maximum speed. As described above, the communication device 30 identifies the standard of the forklift 20 based on the information sent from the vehicle communication portion 28.

This configuration ensures that the remote operation data conforms to the standard of the forklift 20. A control signal SGa that does not conform to the standard of the forklift 20 is not input to the vehicle CPU 25 of the forklift 20. This limits a malfunction of the forklift 20.

The second conversion program TP2 is a conversion program TP that is used to convert a second operation signal SGx2 into a remote instruction signal SGb. The second conversion program TP2 may include a second extraction program, which extracts the data content of the second operation signal SGx2, and a second derivation program, which derives the data content of the remote operation data from the extracted data content of the second operation signal SGx2.

The second derivation program is configured so that the data content of the second operation signal SGx2 corresponds to the data content of the remote operation data. For example, when the operation buttons 42a of the second operation controller 42 include a high-speed button and a low-speed button, a touch on the high-speed button sets a higher traveling speed in the remote operation data as compared with a touch on the low-speed button. A remote instruction signal SGb is thus generated according to the operation mode of the second operation controller 42.

Further, the communication device CPU 31 may derive a remote instruction signal SGb based on the data content of the second operation signal SGx2 and the standard of the forklift 20. For example, when the traveling speed in the remote operation data derived by the second derivation program is higher than the maximum speed specified by the standard of the forklift 20 to be remotely operated, the communication device CPU 31 may update the remote operation data such that the traveling speed is set to the maximum speed.

At step S105, the communication device CPU 31 converts the input operation signal SGxx into a remote instruction signal SGb using the conversion program TP retrieved at step S104. This generates a remote instruction signal SGb that corresponds to the input operation signal SGxx.

For example, when the input operation signal SGxx is a first operation signal SGx1, the communication device CPU 31 reads the first conversion program TP1 from the conversion program storage area 33 and converts the first operation signal SGx1 into a remote instruction signal SGb using the first conversion program TP1. When the input operation signal SGxx is a second operation signal SGx2, the communication device CPU 31 reads the second conversion program TP2 from the conversion program storage area 33 and converts the second operation signal SGx2 into a remote instruction signal SGb using the second conversion program TP2.

Then, the communication device CPU 31 proceeds to step S106 and instructs the communication device communication portion 35 to send the generated remote instruction signal SGb, in other words, sends an instruction. In response to this instruction, the communication device communication portion 35 sends the remote instruction signal SGb to the vehicle communication portion 28.

In the configuration described above, when the input operation signal SGxx is a convertible operation signal SGx, the input operation signal SGxx is converted into a remote instruction signal SGb, which is then sent to the vehicle communication portion 28. In the forklift 20, the remote instruction signal SGb is converted into a control signal SGa, and the traveling actuator 23 or the cargo handling actuator 24 operates based on the control signal SGa. The forklift 20 thus operates according to the operation mode of the operation controller 40.

The industrial vehicle remote operation system 10 of the present embodiment is configured to enable addition, deletion, or change of a usable operation controller 40. Specifically, the industrial vehicle remote operation system 10 is configured to update the information stored in the conversion program storage area 33 so as to enable addition, deletion, or change of an operation signal SGx that is convertible into a remote instruction signal SGb. This is described below.

When an update operation of an operation controller 40 is performed on the touch panel 37, the communication device CPU 31 performs a conversion program update process based on the update execution program 34b stored in the communication device memory 32. The update execution program 34b can be considered as a program for causing the communication device CPU 31 to perform a conversion program update process. In the present embodiment, the communication device CPU 31, which performs the conversion program update process, corresponds to an update portion, and the update execution program 34b corresponds to a program for causing the communication device 30 to function as the update portion.

The update operation of an operation controller 40 may be an operation, or a touch, on the update icon of an operation controller 40 that is displayed on the touch panel 37, for example.

Figure 5:
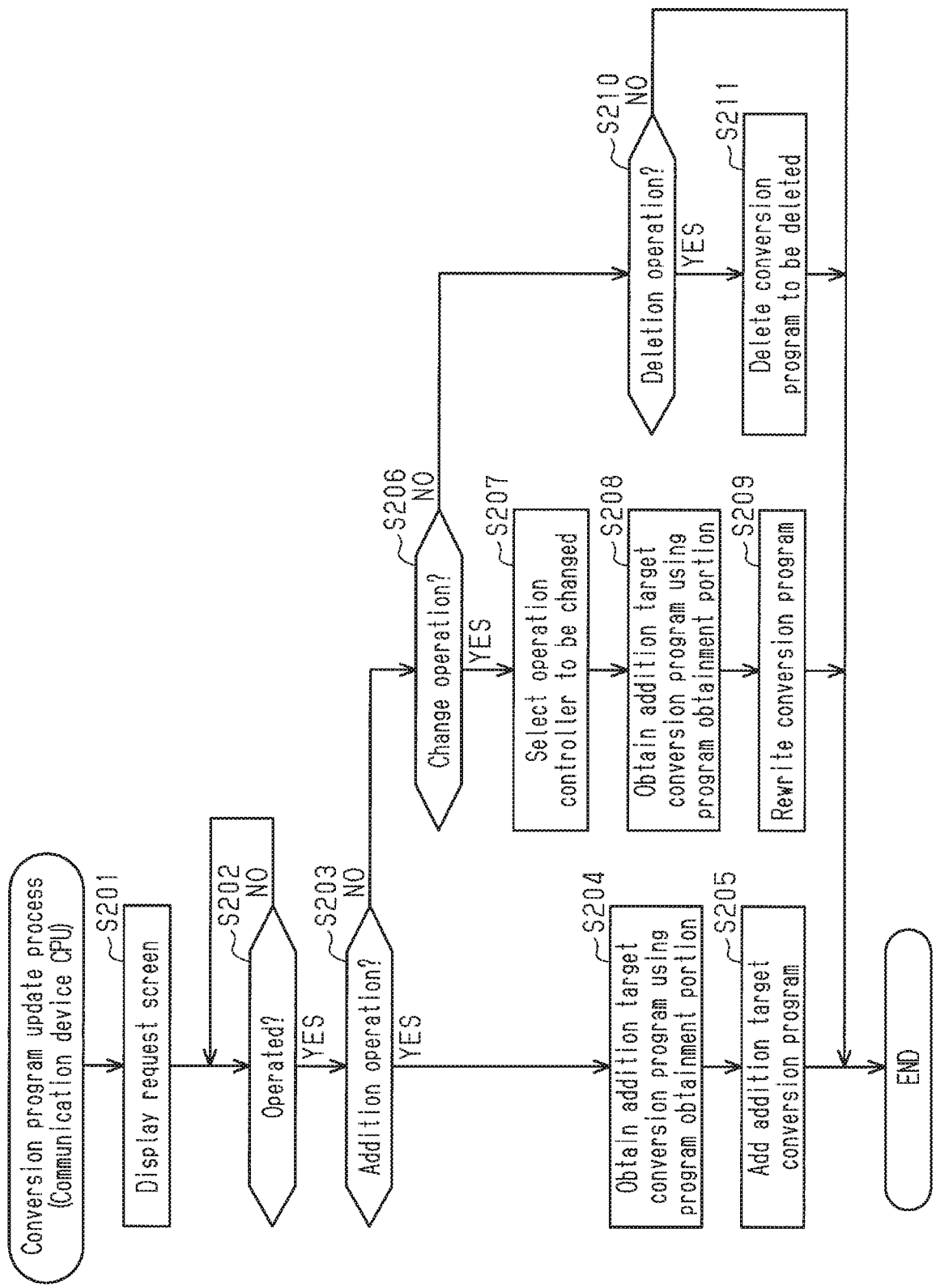
FIG. 5 is a flowchart of a conversion program update process.

Referring to FIG. 5, the conversion program update process is now described.

As shown in FIG. 5, at step S201, the communication device CPU 31 displays a request screen on the touch panel 37.

Figure 6:
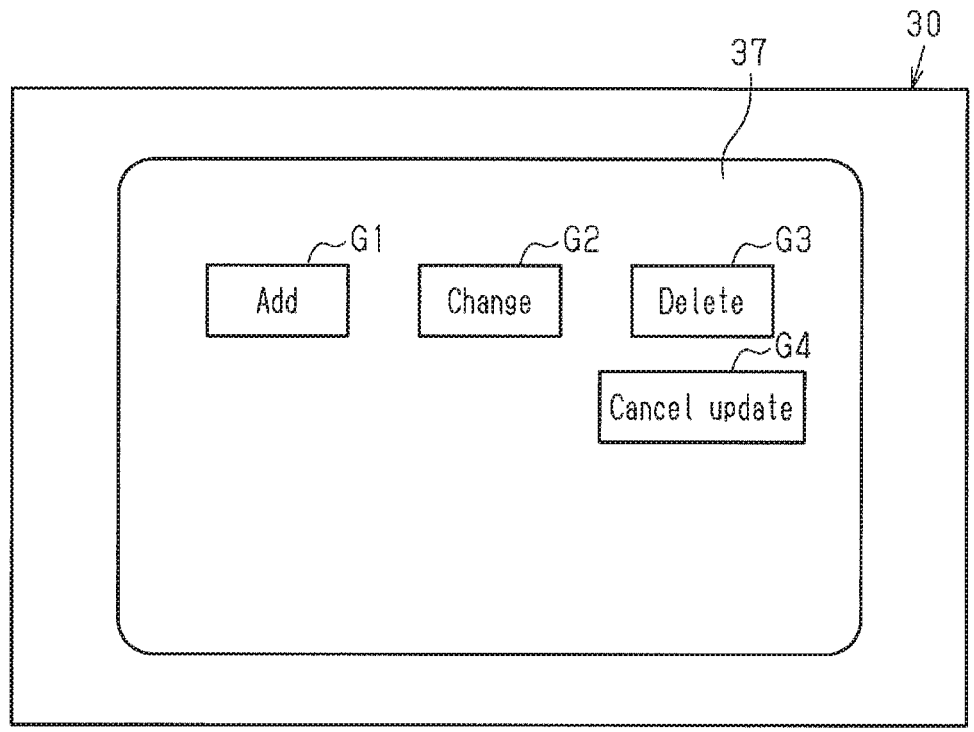
FIG. 6 is a front view showing a communication device in a state where a request screen is displayed on the touch panel.

As shown in FIG. 6, the request screen displays an add icon G1, a change icon G2, a delete icon G3, and an update cancel icon G4 on the touch panel 37, for example. When any of these icons is touched, the communication device CPU 31 receives a request from the operator.

As shown in FIG. 5, after displaying the request screen, the communication device CPU 31 waits at step S202 until any operation, specifically, a request operation or a cancellation operation, is performed. The request operation may be an operation, or a touch, on any of the add icon G1, the change icon G2, and the delete icon G3 when the request screen shown in FIG. 6 is displayed, for example. The cancellation operation may be an operation, or a touch, on the update cancel icon G4. In the present embodiment, the communication device CPU 31, which performs steps S201 and S202, and the touch panel 37 correspond to a request reception portion.

When an operation is performed on the request screen, the communication device CPU 31 performs, at steps S203 to S211, the process corresponding to the operation.

At step S203, the communication device CPU 31 determines whether the operation is an addition operation. The addition operation may be a touch on the add icon G1, for example. The addition operation can be considered as an addition request for a usable operation controller 40. Thus, the process at step S203 can be considered as a process to determine whether an addition request is made. The addition request for a usable operation controller 40 can be considered as an addition request for a convertible operation signal SGx. Further, the addition request for a convertible operation signals SGx can be considered as an addition request for a specific operation signal of a specific data format. The addition request for a specific operation signal of a specific data format can be considered as an addition request for a specific operation controller that outputs a specific operation signal of a specific data format.

When receiving an addition request (addition operation), the communication device CPU 31 proceeds to step S204. At step S204, the communication device CPU 31 obtains an addition target conversion program TPx using the program obtainment portion 36. The obtainment of the addition target conversion program TPx can be considered as obtainment of a specific conversion program used to convert a specific operation signal into a remote instruction signal SGb.

Specifically, the communication device CPU 31 accesses the server that stores conversion programs TP through the program obtainment portion 36 and identifies the operation controllers 40 that can be added. Specifically, the communication device CPU 31 identifies, as the operation controllers 40 that can be added, the operation controllers 40 that are connectable to the reception portion 38 and associated with the conversion programs TP that are stored in the server but not in the conversion program storage area 33. The communication device CPU 31 displays on the touch panel 37 a list of the operation controllers 40 that can be added, allowing the operator to select an operation controller 40 to be added.

In the following descriptions, the operation controller 40 to be added is referred to as an addition target operation controller 40x, and the conversion program TP to be added is referred to as an addition target conversion program TPx.

The communication device CPU 31 waits until a selection operation of the addition target operation controller 40x is performed. The selection operation may be a touch on any of the listed operation controllers 40 that can be added, for example. When a selection operation of the addition target operation controller 40x is performed, the communication device CPU 31 obtains the addition target conversion program TPx using the program obtainment portion 36.

At step S205, the communication device CPU 31 updates the information stored in the conversion program storage area 33 using the addition target conversion program TPx so as to enable conversion of operation signals SGx of the addition target operation controller 40x into remote instruction signals SGb. Specifically, the communication device CPU 31 newly adds the addition target conversion program TPx to the conversion program storage area 33. In addition, the communication device CPU 31 updates the convertible information 39 so that the addition target operation controller 40x is newly included as a usable operation controller 40. The communication device CPU 31 then ends this conversion program update process.

When the operation by the operator is not an addition operation, the communication device CPU 31 determines that the answer is NO at step S203 and proceeds to step S206 to determine whether the operation is a change operation. The change operation may be a touch on the change icon G2, for example.

The change operation can be considered as a change request for a usable operation controller 40. Thus, the process at step S206 can be considered as a process to determine whether a change request is made. The change request for a usable operation controller 40 can be considered as a change request for a convertible operation signal SGx.

When the operation on the touch panel 37 is a change operation, that is, when the touch panel 37 receives a change request, the communication device CPU 31 performs the process of changing a convertible operation signal SGx at steps S207 to S209.

Specifically, at step S207, the communication device CPU 31 prompts the operator to select an operation controller 40 to be changed. That is, the communication device CPU 31 displays on the touch panel 37 a list of the operation controllers 40 that are currently usable, waits until one of them is selected, and then proceeds to step S208 when selection is made.

At step S208, the communication device CPU 31 obtains the addition target conversion program TPx using the program obtainment portion 36. The process at step S208 is the same as the process at step S204 and is not described in detail.

At step S209, the communication device CPU 31 rewrites the information stored in the conversion program storage area 33. Specifically, the communication device CPU 31 rewrites the conversion programs TP stored in the conversion program storage area 33 such that the conversion program TP associated with the operation controller 40 selected at step S207 for change is deleted and that the addition target conversion program TPx obtained at step S208 is added.

For example, under the condition that the conversion program storage area 33 only stores the first conversion program TP1, the first operation controller 41 is selected at step S207, and the second conversion program TP2 is obtained as the addition target conversion program TPx at step S208. In this case, at step S209, the communication device CPU 31 rewrites the first conversion program TP1 stored in the conversion program storage area 33 using the second conversion program TP2. Specifically, the communication device CPU 31 rewrites the information in the conversion program storage area 33 such that the second conversion program TP2 is stored instead of the first conversion program TP1.

In addition, the communication device CPU 31 updates the convertible information 39 such that the usable operation controller 40 is changed from the first operation controller 41 to the second operation controller 42, specifically, the convertible operation signal SGx is changed from the first operation signal SGx1 to the second operation signal SGx2. The communication device CPU 31 then ends this conversion program update process.

As shown in FIG. 5, when determining that the operation on the touch panel 37 is not a change operation, the communication device CPU 31 proceeds to step S210 and determines whether the operation on the touch panel 37 is a delete operation. That is, at step S210, the communication device CPU 31 determines whether a deletion request is made by the operator. The deletion request may be considered as a deletion request for a usable operation controller 40 and also a deletion request for a convertible operation signal SGx.

When the operation on the touch panel 37 is a delete operation, that is, when a deletion request is received, the communication device CPU 31 proceeds to step S211 and performs a process of deleting the conversion program TP to be deleted and then ends this conversion program update process.

Specifically, the communication device CPU 31 displays a list of the operation controllers 40 that are currently usable to allow selection of an operation controller 40 to be deleted. When an operation controller 40 is selected for deletion, the communication device CPU 31 deletes from the conversion program storage area 33 the conversion program TP associated with the operation controller 40 to be deleted. This disables the operation controller 40 that outputs the operation signal SGx associated with the deleted conversion program TP. Further, the communication device CPU 31 updates the convertible information 39 such that the operation controller 40 to be deleted is deleted from the usable operation controllers 40.

For example, when the conversion program storage area 33 stores the first conversion program TP1 and the second conversion program TP2 and the first operation controller 41 is selected for deletion, the communication device CPU 31 deletes the first conversion program TP1. This disables the first operation controller 41. The communication device CPU 31 updates the convertible information 39 such that the first operation controller 41 is deleted from the usable operation controllers 40. The update for deleting the first conversion program TP1 from the conversion program storage area 33 can be considered as an update for deleting a specific conversion program from the storage portion.

Since the first operation controller 41 is associated with the first operation signal SGx1, the deletion request that selects the first operation controller 41 as the target for deletion can be considered as a deletion request to delete the first operation signal SGx1 from the convertible operation signals SGx. Further, the deletion request for deleting the first operation signal SGx1 from the convertible operation signals SGx can be considered as a deletion request for deleting a specific operation signal from the convertible operation signals.

When the operation on the touch panel 37 is not a request operation, specifically, when the operation is a cancellation operation, the communication device CPU 31 determines that the answer is NO at each of steps S203, S206 and S210, closes the request screen, and ends this conversion program update process.

The first embodiment, which has been described above, achieves the following operational advantages.

(1) The industrial vehicle remote operation system 10 includes the forklift 20, which is an industrial vehicle including the vehicle communication portion 28, and the communication device 30 used for remote operation of the forklift 20. The forklift 20 includes the vehicle signal conversion portion 29, which converts a remote instruction signal SGb of a predetermined data format into a control signal SGa of a data format different from the data format of the remote instruction signal SGb. The forklift 20 operates based on the control signal SGa.

The communication device 30 includes the reception portion 38, which receives an operation signal SGx output from an operation controller 40, the program obtainment portion 36, which obtains a conversion program TP for converting the operation signal SGx into a remote instruction signal SGb, and the conversion program storage area 33, which stores conversion programs TP. The communication device 30 includes the communication device CPU 31, which performs a signal conversion process to convert an operation signal SGx into a remote instruction signal SGb using a conversion program TP stored in the conversion program storage area 33, and the communication device communication portion 35, which sends the remote instruction signal SGb to the vehicle communication portion 28.

Accordingly, the communication device CPU 31 converts an operation signal SGx into a remote instruction signal SGb, and the communication device communication portion 35 sends the remote instruction signal SGb to the forklift 20. The vehicle signal conversion portion 29 of the forklift 20 converts the remote instruction signal SGb into a control signal SGa. This allows the forklift 20 to be remotely operated using the operation controller 40. Thus, the forklift 20 can be used in a site that has a risk of collapsing of cargos and in a harsh environment, while reducing the safety concerns. Further, remote operation of the forklift 20 increases the convenience.

In particular, the present embodiment remotely operates the forklift 20 using operation controllers 40, eliminating the need for the communication device 30 to include an operation interface of the lever 41a for remote operation of the forklift 20. This simplifies the structure of the communication device 30.

(2) The reception portion 38 receives a plurality of types of operation signals SGx that are output by a plurality of types of operation controllers 40 and have different data formats. The communication device CPU 31 performs a conversion program update process to update the information stored in the conversion program storage area 33, specifically, the conversion programs TP stored in the conversion program storage area 33, so as to enable addition, deletion, or change of an operation signal SGx that is convertible by the signal conversion process.

Performing the conversion program update process enables addition, deletion, or change of a convertible operation signal SGx, thereby enabling addition, deletion, or change of an operation controller 40 that is usable for remote operation of the forklift 20. Thus, an operation controller 40 for remote operation of the forklift 20 can be newly added or changed. This allows the operator to select an operation controller relatively freely. The increased flexibility in selecting an operation controller improves the convenience.

In recent years, various type of operation controllers 40 are known, and operation controllers 40 of new standards are successively introduced. This may lead to prevalence of operation controllers 40 that are capable of more intricate operations and operation controllers 40 that are easier to operate. Further, the operation controller 40 that the operator finds suitable for use may vary depending on the use site or use mode. For example, simple remote operation may require an operation controller 40 with a simple operation mode, while intricate remote operation may require an operation controller 40 with an intricate operation mode. For this reason, the operator may want to add or change an operation controller 40 according to any change in the state.

In this respect, the present embodiment performs the conversion program update process and is thus capable of operating the forklift 20 with a newly introduced operation controller 40. In addition, the present embodiment is capable of changing the operation controller 40 depending on the use mode or the operator. This increases the convenience.

(3) In the present embodiment, the communication device CPU 31 of the communication device 30 performs the signal conversion process, allowing the forklift 20 to receive remote instruction signals SGb of the predetermined data format. This eliminates the need for the forklift 20 to include a structure for converting a plurality of types of operation signals SGx of different data formats into control signals SGa. This simplifies the structure and control of the vehicle signal conversion portion 29. Further, addition or change of an operation controller 40 does not require an update of the program in the forklift 20 and is thus easy.

Furthermore, it is not required to customize the vehicle signal conversion portion 29 for each vehicle type to accommodate the operation controllers 40 to be used, for example. The common vehicle signal conversion portion 29 can be used regardless of the vehicle type. Thus, forklifts 20 of different models can be remotely operated using a single operation controller 40. For example, the same operation controller 40 and communication device 30 may be used to remotely operate forklifts 20 of different standards or models. This increases the versatility and convenience.

(4) The communication device 30 includes, as the conversion programs TP stored in the conversion program storage area 33, the first conversion program TP1, which converts a first operation signal SGx1 into a remote instruction signal SGb, and the second conversion program TP2, which converts a second operation signal SGx2 into a remote instruction signal SGb. The first operation signal SGx1 is an operation signal SGx that is output by the first operation controller 41 and has the first data format. The second operation signal SGx2 is an operation signal SGx that is output by the second operation controller 42 and has the second data format. When a first operation signal SGx1 is input to the reception portion 38, the communication device CPU 31 converts the first operation signal SGx1 into a remote instruction signal SGb using the first conversion program TP1. When a second operation signal SGx2 is input to the reception portion 38, the communication device CPU 31 converts the second operation signal SGx2 into a remote instruction signal SGb using the second conversion program TP2.

This allows a plurality of types, or two types, of operation controllers 41 and 42, which output operation signals SGx1 and SGx2 of different data formats, to be used as controllers for remote operation of the forklift 20. Thus, the operation controller 40 to be used can be switched between the first operation controller 41 and the second operation controller 42 depending on the remote operation mode of the forklift 20, for example. This increases the convenience.

(5) The vehicle communication portion 28 and the communication device communication portion 35 perform wireless communication, and the remote instruction signal SGb conforms to the wireless communication system used between the vehicle communication portion 28 and the communication device communication portion 35. Specifically, the data format of the remote instruction signal SGb is set based on the wireless communication system used between the vehicle communication portion 28 and the communication device communication portion 35.

This configuration eliminates the need for a cable that connects the communication device 30 to the forklift 20 and thus increases the convenience, as compared with a configuration in which the vehicle communication portion 28 and the communication device communication portion 35 use wired communication.

In this configuration, since the remote instruction signal SGb is set to conform to the wireless communication system, the data format of the remote instruction signal SGb may be different from the data format of the control signal SGa used to control the forklift 20. In this respect, the vehicle signal conversion portion 29 of the present embodiment converts the remote instruction signal SGb into the control signal SGa, enabling remote operation of the forklift 20 while maintaining desirable wireless communication between the vehicle communication portion 28 and the communication device communication portion 35.

(6) The reception portion 38 and each operation controller 40 perform wired communication or wireless communication between each other. The communication range between the communication device communication portion 35 and the vehicle communication portion 28 is larger than the communication range between the reception portion 38 and the operation controller 40.

As such, the range for remote operation is not reduced due to the communication range between the reception portion 38 and the operation controller 40. In addition, even if the communication range between the reception portion 38 and the operation controller 40 varies depending on the specifications of the operation controller 40, the range for remote operation of the forklift 20 will not be smaller than the communication range between the communication device communication portion 35 and the vehicle communication portion 28.

(7) The communication device 30 includes the touch panel 37, which receives a request operation relating to an addition request, a deletion request, and a change request for a usable operation controller 40 (i.e., an operation signal SGx that is convertible by the communication device CPU 31). The communication device CPU 31 updates the information stored in the conversion program storage area 33 based on a request received with the touch panel 37, specifically, a request operation on the touch panel 37. This configuration enables addition, deletion, or change of a usable operation controller 40 according to the needs of the operator.

(8) When an addition request for a convertible operation signal SGx is made, the communication device CPU 31 obtains the addition target conversion program TPx using the program obtainment portion 36. The addition target conversion program TPx is a conversion program TP used to convert operation signals SGx sent from the addition target operation controller 40x into remote instruction signals SGb. The communication device CPU 31 updates the information stored in the conversion program storage area 33 using the addition target conversion program TPx so as to enable conversion of operation signals SGx of the addition target operation controller 40x into remote instruction signals SGb. Specifically, the communication device CPU 31 updates the information stored in the conversion program storage area 33 such that the addition target conversion program TPx is added to the conversion programs TP that are readable from the conversion program storage area 33.

As such, the addition target conversion program TPx is added to the conversion program storage area 33 based on the addition request for a convertible operation signal SGx. This allows the forklift 20 to be remotely operated using the addition target operation controller 40x.

(9) When a change request is made to change the convertible operation signal SGx from the first operation signal SGx1 to the second operation signal SGx2 under the condition that the conversion program storage area 33 stores the first conversion program TP1, the communication device CPU 31 obtains the second conversion program TP2 using the program obtainment portion 36. The communication device CPU 31 then replaces the first conversion program TP1 stored in the conversion program storage area 33 with the second conversion program TP2.

This configuration enables changing of the usable operation controller 40. This allows the forklift 20 to be remotely operated using the desired operation controller 40.

A change request for changing the convertible operation signal SGx from the first operation signal SGx1, which is associated with the first conversion program TP1, to the second operation signal SGx2, which is associated with the second conversion program TP2, can be considered as a change request for changing the usable operation controller 40 from the first operation controller 41, which outputs the first operation signal SGx1, to the second operation controller 42, which outputs the second operation signal SGx2.

(10) When the conversion program storage area 33 stores the first conversion program TP1 and a deletion request is made to delete the first operation signal SGx1 from the convertible operation signals SGx, the communication device CPU 31 updates so as to delete the first conversion program TP1 from the conversion program storage area 33.

This configuration deletes the unnecessary first conversion program TP1, allowing the conversion program storage area 33 to store other conversion program TP. This effectively uses the limited storage capacity of the conversion program storage area 33. In other words, even when the storage capacity of the conversion program storage area 33 is limited, the usable operation controller 40 can be changed.

(11) The remote operation program 34 includes the signal conversion execution program 34a, which causes the communication device 30 (the communication device CPU 31) to perform the signal conversion process, and the update execution program 34b, which causes the communication device 30 to perform the conversion program update process. This allows the communication device 30 to function to convert operation signals SGx into remote instruction signals SGb, and enables addition, deletion, or change of a convertible operation signal SGx. In other words, it is possible to add, delete, or change a usable operation controller 40. Advantages (1) and (2) are thus obtained.

Second Embodiment

In the second embodiment, the communication device 30 is configured to select an operation controller 40 to be used. This is now described in detail.

When there is a plurality of types of usable operation controllers 40, the communication device CPU 31 of the present embodiment performs a selection process to select an operation controller 40 to be used.

Specifically, the remote operation program 34 of the communication device memory 32 includes a selection execution program, which causes the communication device CPU 31 to perform a selection process. The communication device CPU 31 reads the selection execution program and performs a selection process. The communication device CPU 31, which performs the selection process, corresponds to a selection portion, and the selection execution program corresponds to a program for causing the communication device 30 to function as the selection portion.

Figure 7:
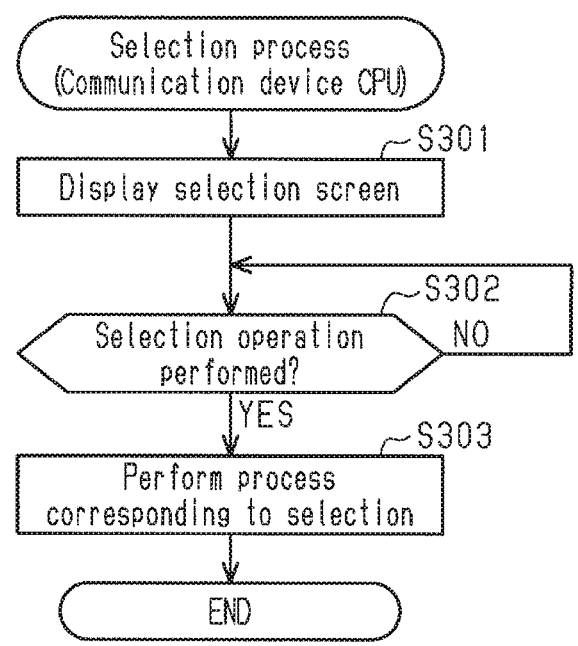
FIG. 7 is a flowchart of a selection process.

Referring to FIG. 7, the selection process is now described.

As shown in FIG. 7, at step S301, the communication device CPU 31 displays a selection screen on the touch panel 37. Specifically, the communication device CPU 31 identifies the usable operation controllers 40 based on the convertible information 39, and displays all the icons of the usable operation controllers 40 on the touch panel 37.

Figure 8:
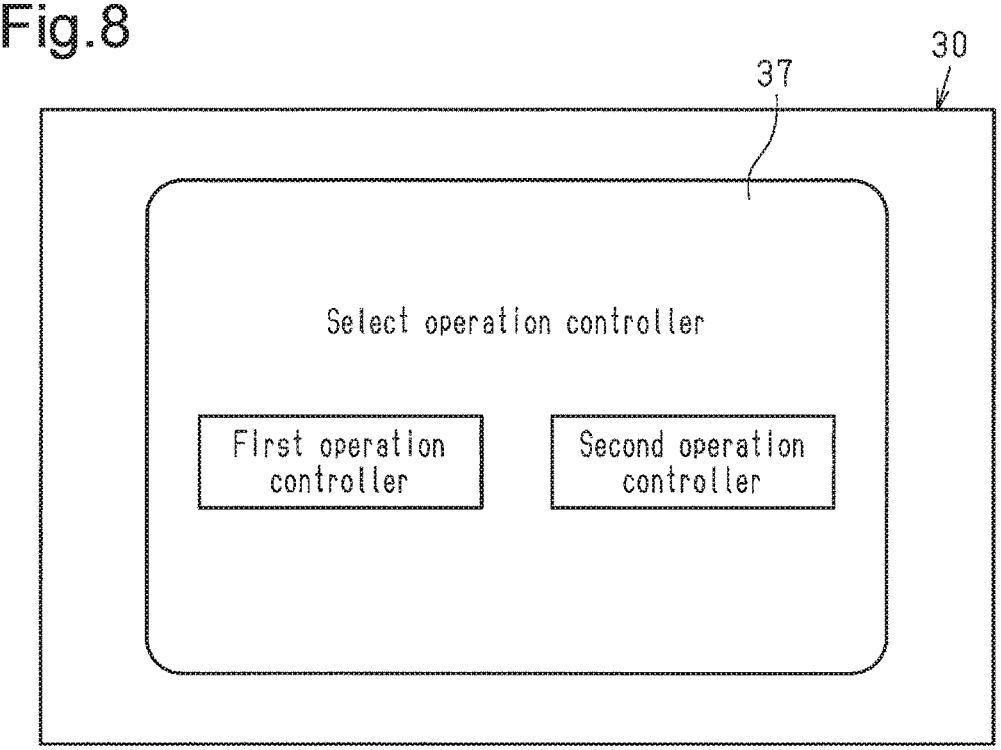
FIG. 8 is a front view showing the communication device in a state where a selection screen is displayed on the touch panel.

Thus, as shown in FIG. 8, the operation controllers 40 that are currently usable are displayed on the selection screen. For the sake of convenience in explanation, the usable operation controllers 40 of the present embodiment include the first operation controller 41 and the second operation controller 42.

As shown in FIG. 7, the communication device CPU 31 waits at step S302 until a selection operation is performed. The selection operation may be a touch on one of the icon of the first operation controller 41 and the icon of the second operation controller 42 displayed on the selection screen.

When a selection operation is performed, the communication device CPU 31 proceeds to step S303 to perform the process corresponding to the selection, and ends this selection process. In the process corresponding to the selection, the communication device CPU 31 sets the selected operation controller 40 as the selected operation controller 40m, and sets the operation signal SGx that is output by the selected operation controller 40m as the selected operation signal SGxm.

For example, when the icon of the first operation controller 41 on the selection screen is touched, the communication device CPU 31 sets the first operation controller 41 as the selected operation controller 40m and sets the first operation signal SGx1 as the selected operation signal SGxm. One type is thus selected from the plurality of types of usable operation controllers 40.

A plurality of types of usable operation controllers 40 results in a plurality of types of convertible operation signals SGx. As such, selecting one of a plurality of types of usable operation controllers 40 can be considered as selecting one of a plurality of types of convertible operation signals SGx. Further, the selection process can be considered as a process of selecting one of a plurality of types of convertible operation signals SGx.

Figure 9:
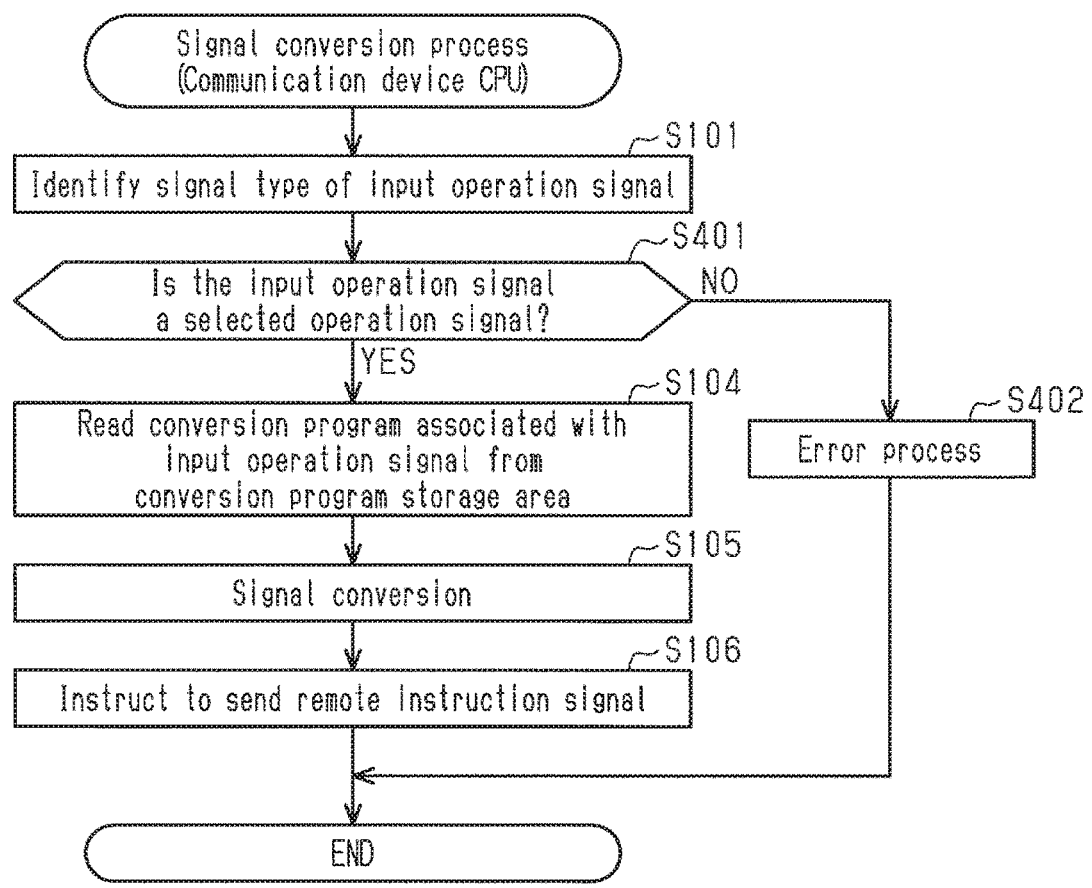
FIG. 9 is a flowchart of a signal conversion process in a second embodiment.

Referring to FIG. 9, a signal conversion process is now described that is performed under the condition that the selected operation controller 40m is set.

As shown in FIG. 9, when the selected operation controller 40m is set, the communication device CPU 31 performs step S401 instead of step S102. At step S401, the communication device CPU 31 determines whether the input operation signal SGxx is the selected operation signal SGxm. The process at step S401 can be considered as a process of determining whether the operation controller 40 associated with the input operation signal SGxx is the selected operation controller 40m.

When the input operation signal SGxx is the selected operation signal SGxm, or when the selected operation signal SGxm is input to the reception portion 38, the communication device CPU 31 determines that the answer at step S401 is YES and performs steps S104 to S106. When the input operation signal SGxx is not the selected operation signal SGxm, or when an operation signal SGx other than the selected operation signal SGxm is input to the reception portion 38, the communication device CPU 31 determines that the answer at step S401 is NO, performs an error process at steps S402, and ends this signal conversion process.

In the error process at step S402, the communication device CPU 31 first determines whether the input operation signal SGxx is a convertible operation signal SGx. When the input operation signal SGxx is a convertible operation signals SGx, the communication device CPU 31 indicates on the touch panel 37 that the operation controller 40 that is currently operated is usable but not selected. When the input operation signal SGxx is not a convertible operation signal SGx, the communication device CPU 31 indicates on the touch panel 37 that the operation controller 40 that is currently operated is not currently usable. Signal conversion of operation signals SGx other than the selected operation signal SGxm is thus restricted. That is, when one of a plurality of types of convertible operation signals SGx is selected, the communication device CPU 31 restricts conversion of operation signals SGx other than the selected operation signal SGx (the selected operation signal SGxm) into remote instruction signals SGb.

The present embodiment, which has been described above, achieves the following operational advantages.

(12) When there is a plurality of types of operation signals SGx that is convertible into remote instruction signals SGb, the communication device CPU 31 performs a selection process to select one of a plurality of types of convertible operation signals SGx. That is, in the selection process, the communication device CPU 31 selects one of a plurality of types of usable operation controllers 40. When the selected operation signal SGxm, which is selected in the selection process, is input to the reception portion 38, the communication device CPU 31 converts the selected operation signal SGxm into a remote instruction signal SGb. When an operation signal SGx other than the selected operation signal SGxm is input to the reception portion 38, the communication device CPU 31 restricts and prohibits conversion into a remote instruction signal SGb.

As such, the operation controller 40 of the type selected in the selection process is usable for remote operation of the forklift 20, whereas operation controllers 40 of other types are restricted and cannot be used for remote operation of the forklift 20. This reduces the possibility that the forklift 20 malfunctions due to an operation of an unintended operation controller 40 when there is a plurality of types of usable operation controllers 40.

Third Embodiment

In the third embodiment, the forklift 20, instead of the communication device 30, performs the signal conversion process and the conversion program update process. This is now described in detail.

Figure 10:
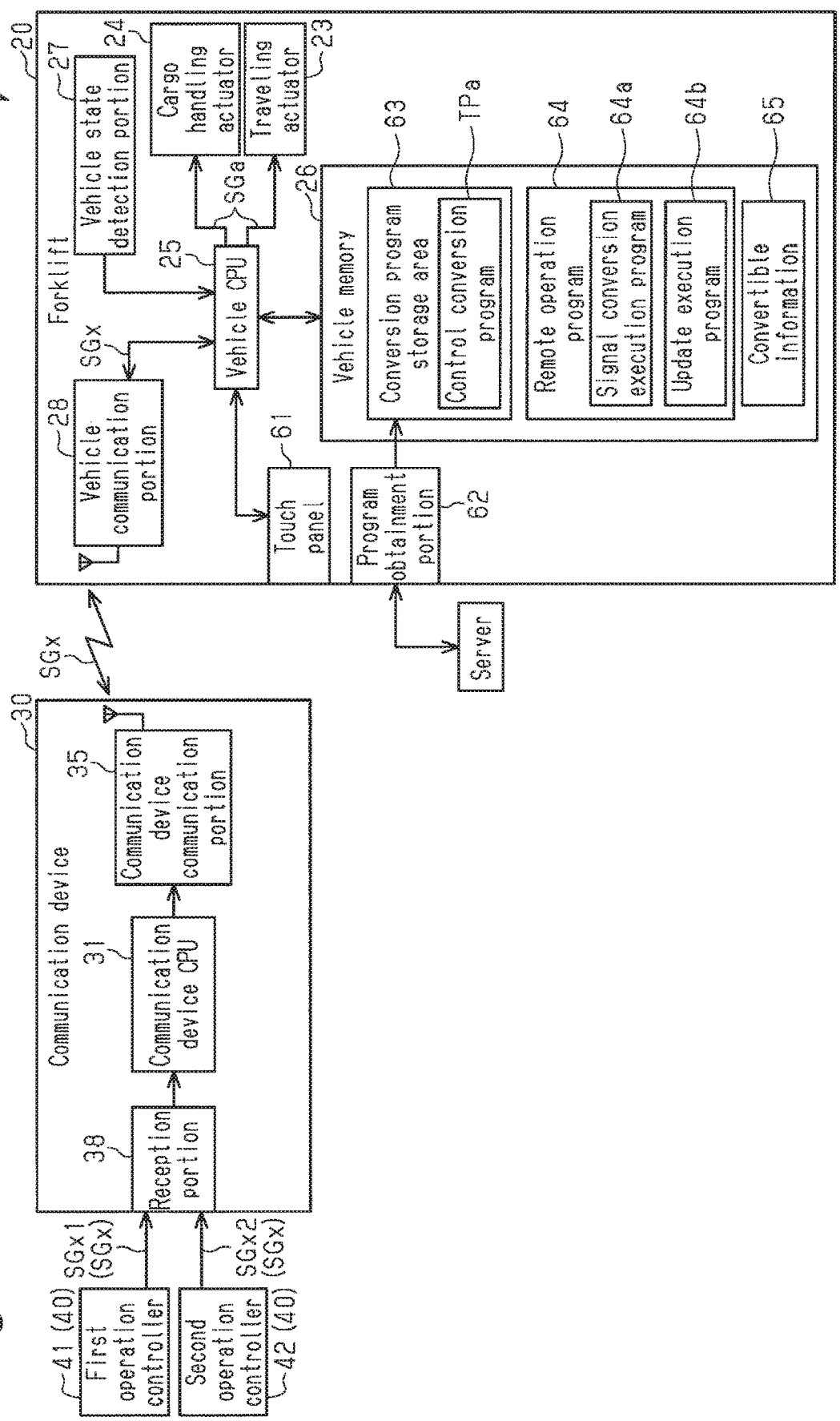
FIG. 10 is a schematic view showing an industrial vehicle and an industrial vehicle remote operation system of a third embodiment.

As shown in FIG. 10, when an operation signal SGx is input to the reception portion 38, the communication device CPU 31 of the present embodiment instructs the communication device communication portion 35 to send the operation signal SGx to the vehicle communication portion 28. That is, the communication device 30 of the present embodiment functions as a repeater between the operation controllers 40 and the forklift 20.

In this case, the vehicle communication portion 28 of the forklift 20 receives, instead of remote instruction signals SGb of the fixed data format, a plurality of types of operation signals SGx of different data formats. That is, in this embodiment, the vehicle communication portion 28 serves as the reception portion.

The forklift 20 of the present embodiment includes a touch panel 61 and a program obtainment portion 62. The touch panel 61 and the program obtainment portion 62 are identical with the touch panel 37 and the program obtainment portion 36 of the first embodiment.

The vehicle memory 26 of the forklift 20 of the present embodiment includes a conversion program storage area 63, which stores control conversion programs TPa, a remote operation program 64, and convertible information 65. The remote operation program 64 includes a signal conversion execution program 64a and an update execution program 64b.

The control conversion programs TPa of the present embodiment are used to convert operation signals SGx into control signals SGa. The signal conversion execution program 64a causes the vehicle CPU 25 to perform a signal conversion process to convert an operation signal SGx into a control signal SGa using a control conversion program TPa stored in the conversion program storage area 63.

When an operation signal SGx is input to the vehicle communication portion 28, the vehicle CPU 25 of the present embodiment reads the signal conversion execution program 64a and performs a signal conversion process. This generates a control signal SGa that corresponds to the operation signal SGx. Based on this control signal SGa, the vehicle CPU 25 controls the traveling actuator 23 and the cargo handling actuator 24.

When an addition request, a deletion request, or a change request of a usable operation controller 40 is made through operation of the touch panel 61, the vehicle CPU 25 reads the update execution program 64b and performs a conversion program update process, which updates the information stored in the conversion program storage area 63.

The specific configurations of the signal conversion process and the conversion program update process of the present embodiment are not described in detail since they are basically the same as the signal conversion process and the conversion program update process of the first embodiment, except for that the control conversion program TPa and the control signal SGa are used instead of the conversion program TP and the remote instruction signal SGb. In addition, the convertible information 65 is the same as the convertible information 39 of the first embodiment.

The present embodiment, which has been described above, achieves the following operational advantages.

(13) The forklift 20, which operates based on control signals SGa, includes the vehicle communication portion 28, which receives an operation signal SGx output by an operation controller 40, and the conversion program storage area 63, which stores the control conversion programs TPa for converting operation signals SGx into control signals SGa. The forklift 20 includes the vehicle CPU 25, which performs the signal conversion process that converts an operation signal SGx into a control signal SGa using a control conversion program TPa stored in the conversion program storage area 63. The vehicle communication portion 28 receives a plurality of types of operation signals SGx that are output by a plurality of types of operation controllers 40 and have different data formats. To enable addition, deletion, or change of a convertible operation signal SGx, the forklift 20 includes the vehicle CPU 25, which performs the conversion program update process for updating the information stored in the conversion program storage area 63. Advantage (2) described above is thus achieved.

Each of the above-illustrated embodiments may be modified as follows.

The communication device 30 may directly perform remote operation of the forklift 20. For example, the communication device CPU 31 displays a remote operation screen on the touch panel 37 and generates a remote instruction signal SGb according to the mode of operation performed on icons displayed on the remote operation screen. The communication device CPU 31 uses the communication device communication portion 35 to send the generated remote instruction signal SGb. Thus, instead of the operation controller 40, the communication device 30 can be used for remote operation of the forklift 20.

The operation of the communication device 30 is not limited to the operation on icons displayed on the remote operation screen and may be any operation. For example, the communication device 30 may include an operation interface. The communication device 30 may have any configuration as long as it is operable by an operator and includes an operation detection portion to detect the operation mode.

The industrial vehicle remote operation system 10 may be configured so as to enable both of the remote operation of the forklift 20 using an operation controller 40 and the remote operation of the forklift 20 using the communication device 30. Specifically, the communication device CPU 31 may include the function of converting the operation signal SGx into the remote instruction signal SGb and the function of generating the remote instruction signal SGb based on the detection result of the operation detection portion. That is, the industrial vehicle remote operation system 10 may have any structure as long as it can remotely operate the forklift 20 using at least one of an operation controller 40 and the communication device 30.

This modification allows for the selection between the remote operation using an operation controller 40 and the remote operation using the communication device 30 depending on the model or use mode of the forklift 20 to be remotely operated. This further increases the convenience. For example, an operation controller 40 may be used for a relatively simple remote operation, while the communication device 30 may be used for a relatively intricate remote operation.

In the configuration in which operation controllers 40 and the communication device 30 are both usable for remote operation, the communication device CPU 31 may perform a selection process to select which one of the operation controllers 40 and the communication device 30 is used for remote operation, in a similar manner as the second embodiment. This allows for switching of controllers for remote operation. That is, when the communication device 30 is capable of remote operation of the forklift 20, the communication device 30 may be included in the options in the selection process.

Nevertheless, to simplify the configuration of the communication device 30, the communication device 30 is preferably not configured to directly perform remote operation of the forklift 20.

The specific configuration of the conversion programs TP may be set freely. For example, a conversion program TP may include mathematical expressions or may be a tabular program in which the data content of each operation signal SGx is associated with the data content of the corresponding remote operation data. The same applies to the control conversion programs TPa.

The vehicle communication portion 28 and the communication device communication portion 35 may perform wired communication between each other or may perform both wired communication and wireless communication.

The communication device 30 may be detachable from the forklift 20. For example, the forklift 20 may include a mount base, which has a vehicle side connector and receives the communication device 30. In this case, the communication device 30 preferably has a communication device side connector, which electrically connects the communication device 30 to the forklift 20 when the communication device 30 is placed on the mount base. Placing the communication device 30 on the mount base thus allows for signal exchange between the communication device 30 and the forklift 20.

The embodiments described above use the touch panel 37 or 61 to receive a request from the operator and to select an operation controller 40, but other means may be used instead of the touch panel 37 or 61. That is, the request reception portion may have any configuration that is capable of receiving a request from the operator. Likewise, the selection portion may have any configuration that allows the operator to make selection.

The maximum value of the number of types of usable operation controllers 40 may be set freely and may be 3 or more, for example. The maximum value of the number of types of usable operation controllers 40 may be 1. In this case, it is still possible to use a plurality of types of operation controllers 40 for remote operation by changing the conversion program TP stored in the conversion program storage area 33 or 63.

The vehicle communication portion 28 does not have to send the detection transmission signal to the communication device 30.

In the first and second embodiments, the steps related to change in the conversion program update process (steps S207 to S209) may be omitted. In this case, the communication device CPU 31 may perform an addition process and a deletion process. Further, the communication device CPU 31 may be configured to perform only one of addition and deletion of a usable operation controller 40. Nevertheless, to improve convenience, the communication device CPU 31 is preferably capable of both addition and deletion. The same applies to the third embodiment.

In the first and second embodiments, when the operation controllers 40 are connected to the reception portion 38 wirelessly, the communication device communication portion 35 may function as the reception portion 38.

In the first and second embodiments, the reception portion 38 and the program obtainment portion 36 may be an integral portion or physically discrete portions. For example, when the reception portion 38 is a connector used for wired communication with the operation controllers 40, the connector may be connected to a storage medium storing conversion programs TP. In this case, the connector functions as the reception portion 38 and the program obtainment portion 36. The same applies to the third embodiment.

In the first and second embodiments, the conversion programs TP may be obtained by the communication device communication portion 35. In this case, the communication device communication portion 35 corresponds to the obtainment portion.

As long as the reception portion 38 is capable of receiving a plurality of types of operation signals SGx1 and SGX2 that are output by a plurality of types of operation controllers 41 and 42 and have different data formats, the reception portion 38 does not have to be simultaneously connected to the plurality of types of operation controllers 41 and 42. For example, the reception portion 38 may include only one general-purpose connector that is connectable to the operation controllers 41 and 42 by wire. In this case, the reception portion 38 can still receive different types of operation signals SGx1 and SGx2 by changing the operation controller 40 connected through the general-purpose connector. When the reception portion 38 includes a general-purpose connector, the reception portion 38 may receive an operation signal SGx from an operation controller 40 that is connectable with the general-purpose connector.

Alternatively, when the reception portion 38 has a wireless device that is connectable using a predetermined wireless standard such as the Wi-Fi standard, the reception portion 38 receives a plurality of types of operation signals SGx from a plurality of types of operation controllers 40 that are wirelessly connectable to the wireless device. In other words, the number of the operation controllers 40 actually connected to the reception portion 38 does not have to be equal to the number of the operation signals SGx that can be received by the reception portion 38. That is, the reception portion 38 can be considered as an input permission portion that permits input of operation signals SGx.

In the first and second embodiments, the communication device CPU 31 may automatically perform the conversion program update process. That is, the conversion program update process does not necessarily require a request operation by the operator and may be performed at any time. For example, the communication device CPU 31 may perform the conversion program update process when the server issues an addition request. The same applies to the third embodiment.

The second embodiment uses two types of usable operation controllers 40, but the number of types is not limited to 2. Three or more types may be used. In this case, one type of operation controller 40 or a plurality of types of operation controllers 40 may be selected from three or more types of operation controllers 40. That is, the selected operation controller 40m is not limited to one type.

The third embodiment does not have to include the communication device 30, and operation signals SGx of operation controllers 40 may be directly input to the forklift 20. In this case, the forklift 20 may include, in addition to the vehicle communication portion 28, a reception portion for receiving operation signals SGx of operation controllers 40. Further, when the forklift 20 includes a reception portion that is separate from the vehicle communication portion 28, the vehicle communication portion 28 may be omitted.

In the third embodiment, the vehicle communication portion 28 may function as the program obtainment portion 62. Specifically, when control conversion programs TPa are stored in a server, the vehicle communication portion 28 may access the server.

In the third embodiment, the vehicle CPU 25 may be configured to perform a signal conversion process for converting an operation signal SGx into a remote instruction signal SGb and a signal conversion process for converting a remote instruction signal SGb into a control signal SGa. That is, it is not necessary to directly convert an operation signal SGx into a control signal SGa.

The conversion program storage area 33 or 63 does not have to store the conversion programs TP or TPa. In this case, signal conversion is still possible by obtaining the required conversion program TP or TPa using the program obtainment portion 36 or 62 and by adding the obtained conversion program TP or TPa to the conversion program storage area 33 or 63. That is, updating the information stored in the storage portion includes performing addition, deletion, or change of a conversion program when the storage portion stores conversion programs, and also includes adding a conversion program when the storage portion does not store a conversion program.

The industrial vehicle is not limited to the forklift 20 and may be any vehicle. In addition, the industrial vehicle may have an automatic driving function of traveling in a predetermined pattern.

In the first and second embodiments, each remote instruction signal SGb is associated with a corresponding one of the control signals SGa, but a single remote instruction signal SGb may be associated with a plurality of control signals SGa or vice versa. The communication device CPU 31 may use the communication device communication portion 35 to bundle a plurality of remote instruction signals SGb into packet data and send it to the vehicle communication portion 28. In this case, the vehicle signal conversion portion 29 may unpack the packet data received by the vehicle communication portion 28 to derive a plurality of control signals SGa.

In the first and second embodiments, the operation signal SGx does not have to include identification information. In this case, the communication device CPU 31 may identify the operation controller 40 based on the protocol of the operation signal SGx received by the reception portion 38. Specifically, the communication device memory 32 may store data in which a plurality of types of operation controllers 40 and protocol information of operation signals SGx are associated. The communication device CPU 31 refers to this data and derives the operation controller 40 that outputs the operation signal SGx of the protocol identical with the protocol of the operation signal SGx that is input to the reception portion 38. This allows the communication device 30 to identify the operation controller 40 without using identification information. The same applies to the third embodiment In this modification, instead of the protocol, the operation controller 40 to be connected may be identified using the address used to connect the operation controller 40 to the communication device 30 (e.g., MAC address).

Figure 11:
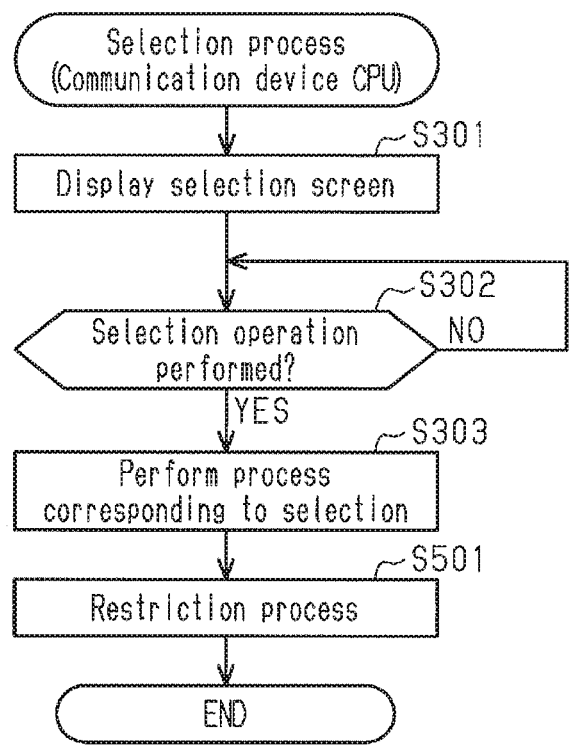
FIG. 11 is a flowchart of a selection process in a modification.

As shown in FIG. 11, after performing step S303, the communication device CPU 31 of the second embodiment may perform, at step S501, a restriction process to restrict the reception portion 38 so as to prohibit input of operation signals SGx other than the selected operation signal SGxm, while permitting input of the selected operation signal SGxm to the reception portion 38. For example, the communication device CPU 31 may restrict the reception portion 38 such that the selected operation controller 40m, which outputs the selected operation signal SGxm, is connectable to the reception portion 38 but operation controllers 40 other than the selected operation controller 40m are prohibited from being connected to the reception portion 38. This achieves advantage (12) without performing steps S101 and S401.

In this modification, the communication device CPU 31, which performs steps S301 to S303, corresponds to the selection portion, and the communication device CPU 31, which performs step S501, corresponds to a restriction portion.

The above illustrated embodiments and the modifications may be combined in any suitable manner.

One example obtainable from the above embodiments and modifications will now be described.

(1) A request reception portion may be provided that receives a request operation relating to an addition request, a deletion request, or a change request of an operation signal that is convertible by the second signal conversion portion. The update portion may update the information stored in the storage portion in response to a request operation received by the request reception portion.

(2) An industrial vehicle remote operation system comprising: an industrial vehicle, which includes a vehicle communication portion; and a communication device configured to be used for remote operation of the industrial vehicle, wherein the industrial vehicle includes a first signal conversion portion configured to convert a remote instruction signal of a predetermined data format into a control signal of a data format different from the data format of the remote instruction signal, the industrial vehicle is configured to operate based on the control signal converted by the first signal conversion portion, the communication device includes: a reception portion to which a first operation signal of a first data format, which is output by a first operation controller, or a second operation signal of a second data format, which is output by a second operation controller, is input; a storage portion configured to store a first conversion program for converting the first operation signal into the remote instruction signal and a second conversion program for converting the second operation signal into the remote instruction signal; and a second signal conversion portion configured to convert the first operation signal into the remote instruction signal using the first conversion program when the first operation signal is input to the reception portion and convert the second operation signal into the remote instruction signal using the second conversion program when the second operation signal is input.

(3) A communication device comprising: a vehicle communication portion configured to receive a remote instruction signal of a predetermined data format; and a first signal conversion portion configured to convert the remote instruction signal into a control signal of a data format different from the data format of the remote instruction signal, wherein the communication device is configured to be used for remote operation of an industrial vehicle that operates based on the control signal converted by the first signal conversion portion, the communication device further comprises: a reception portion to which a first operation signal of a first data format, which is output by a first operation controller, or a second operation signal of a second data format, which is output by a second operation controller, is input; a storage portion configured to store a first conversion program for converting the first operation signal into the remote instruction signal and a second conversion program for converting the second operation signal into the remote instruction signal; and a second signal conversion portion configured to convert the first operation signal into the remote instruction signal using the first conversion program when the first operation signal is input to the reception portion and convert the second operation signal into the remote instruction signal using the second conversion program when the second operation signal is input.

(4) An industrial vehicle configured to operate based on a control signal, the industrial vehicle comprising: a reception portion to which a first operation signal of a first data format, which is output by a first operation controller, or a second operation signal of a second data format, which is output by a second operation controller, is input; a storage portion configured to store a first conversion program for converting the first operation signal into the control signal and a second conversion program for converting the second operation signal into the control signal; and a second signal conversion portion configured to convert the first operation signal into the control signal using the first conversion program when the first operation signal is input to the reception portion and convert the second operation signal into the control signal using the second conversion program when the second operation signal is input to the reception portion.

With respect to examples (1) to (4), the program obtainment portion 36 or 62 and the conversion program update process (the update execution program 34b or 64b) are not necessarily required.

The invention claimed is:

1. An industrial vehicle remote operation system comprising:
an industrial vehicle including a vehicle communication portion; and
a communication device configured to output a remote instruction signal to the industrial vehicle, wherein
the industrial vehicle includes a first signal conversion portion configured to convert the remote instruction signal of a predetermined data format into a control signal of a data format different from the data format of the remote instruction signal,
the industrial vehicle is configured to operate based on the control signal converted by the first signal conversion portion,
the communication device includes:
a reception portion configured to receive an operation signal, wherein the operation signal is output by an operation controller that is remotely located from the communication device and the industrial vehicle;
an obtainment portion configured to obtain a conversion program for converting the operation signal into the remote instruction signal;
a storage portion configured to store the conversion program;
a second signal conversion portion configured to convert the operation signal into the remote instruction signal using the conversion program stored in the storage portion; and
a communication device communication portion configured to send the remote instruction signal to the vehicle communication portion,
the reception portion is configured to receive a plurality of types of operation signals that are output by a plurality of types of operation controllers and have different data formats, and
the communication device includes an update portion configured to update information stored in the storage portion so as to enable addition, deletion, and change of one or more of the operation signals that are convertible by the second signal conversion portion.

2. The industrial vehicle remote operation system according to claim 1, wherein
the plurality of types of operation controllers include a first operation controller and a second operation controller,
the communication device includes, as the conversion program stored in the storage portion
a first conversion program that converts a first operation signal of a first data format, which is output by the first operation controller, into the remote instruction signal, and
a second conversion program that converts a second operation signal of a second data format, which is output by the second operation controller, into the remote instruction signal, and
the second signal conversion portion is configured to
convert the first operation signal into the remote instruction signal using the first conversion program when the first operation signal is input to the reception portion, and
convert the second operation signal into the remote instruction signal using the second conversion program when the second operation signal is input to the reception portion.

3. The industrial vehicle remote operation system according to claim 1, wherein
the communication device includes a selection portion configured to, when there is a plurality of types of operation signals that are each convertible into the remote instruction signal, select one of the plurality of types of convertible operation signals, and
the second signal conversion portion is configured to convert a selected operation signal, which is one of the operation signals that is selected by the selection portion, into the remote instruction signal and restrict and prohibit an operation signal other than the selected operation signal from being converted into the remote instruction signal.

4. The industrial vehicle remote operation system according to claim 1, wherein the communication device includes
a selection portion configured to, when there is a plurality of types of operation signals that are each convertible into the remote instruction signal, select one of the plurality of types of convertible operation signals, and
a restriction portion configured to restrict the reception portion such that input of a selected operation signal, which is one of the operation signals that is selected by the selection portion, is permitted while input of an operation signal other than the selected operation signal is prohibited.

5. The industrial vehicle remote operation system according to claim 1, wherein
the vehicle communication portion and the communication device communication portion are configured to perform wireless communication between each other, and
the remote instruction signal is set to conform to a wireless communication system used between the vehicle communication portion and the communication device communication portion.

6. The industrial vehicle remote operation system according to claim 1, wherein
the reception portion and each operation controller are configured to perform wired communication or wireless communication between each other, and
a communication range between the communication device communication portion and the vehicle communication portion is larger than a communication range between the reception portion and each operation controller.

7. The industrial vehicle remote operation system according to claim 1, wherein, when an addition request for a specific operation signal of a specific data format is made, the update portion is configured to obtain, using the obtainment portion, a specific conversion program for converting the specific operation signal into the remote instruction signal and update the information stored in the storage portion using the specific conversion program so as to enable the second signal conversion portion to convert the specific operation signal into the remote instruction signal.

8. The industrial vehicle remote operation system according to claim 1, wherein, when the storage portion stores, as the conversion program, a first conversion program, which converts a first operation signal of a first data format into the remote instruction signal, and a change request is made to change one of the convertible operation signals from the first operation signal to a second operation signal of a second data format, the update portion is configured to obtain, using the obtainment portion, a second conversion program, which converts the second operation signal into the remote instruction signal, and perform update so as to rewrite the conversion program stored in the storage portion using the second conversion program.

9. The industrial vehicle remote operation system according to claim 1, wherein, when the storage portion stores, as the conversion program, a specific conversion program, which converts a specific operation signal of a specific data format into the remote instruction signal, and a deletion request is made to delete the specific operation signal from the convertible operation signals, the update portion is configured to perform update so as to delete the specific conversion program from the storage portion.

10. A communication device configured to be used for remote operation of an industrial vehicle, the industrial vehicle including:
a vehicle communication portion configured to receive a remote instruction signal of a predetermined data format; and
a first signal conversion portion configured to convert the remote instruction signal into a control signal of a data format different from the data format of the remote instruction signal, wherein
the communication device is configured to output the remote instruction signal to the industrial vehicle that operates based on the control signal converted by the first signal conversion portion,
the communication device further comprising:
a reception portion configured to receive an operation signal, wherein the operation signal is output by an operation controller that is remotely located from the communication device and from the industrial vehicle;
an obtainment portion configured to obtain a conversion program, which converts the operation signal into the remote instruction signal;
a storage portion configured to store the conversion program;
a second signal conversion portion configured to convert the operation signal into the remote instruction signal using the conversion program stored in the storage portion; and
a communication device communication portion configured to send the remote instruction signal to the vehicle communication portion,
the reception portion is configured to receive a plurality of types of operation signals that are output by a plurality of types of operation controllers and have different data formats, and
the communication device includes an update portion configured to update information stored in the storage portion so as to enable addition, deletion, and change of one or more of the operation signals that are convertible by the second signal conversion portion.

11. An industrial vehicle configured to operate based on a control signal, the industrial vehicle comprising:
a reception portion configured to receive an operation signal, wherein the operation signal is output by an operation controller that is remotely located from the industrial vehicle;
an obtainment portion configured to obtain a control conversion program, which converts the operation signal into the control signal;
a storage portion configured to store the control conversion program; and
a signal conversion portion configured to convert the operation signal into the control signal using the control conversion program stored in the storage portion, wherein
the reception portion is configured to receive a plurality of types of operation signals that are output by a plurality of types of operation controllers and have different data formats, and
the industrial vehicle comprises an update portion configured to update information stored in the storage portion so as to enable addition, deletion, and change of one or more of the operation signals that are convertible by the signal conversion portion.

12. A computer-readable storage medium that stores an industrial vehicle remote operation program used for remote operation by a communication device, wherein
the industrial vehicle includes
a vehicle communication portion configured to receive a remote instruction signal of a predetermined data format, and
a first signal conversion portion configured to convert the remote instruction signal into a control signal of a data format different from the data format of the remote instruction signal,
the industrial vehicle is configured to operate based on the control signal converted by the first signal conversion portion,
the communication device includes
a reception portion configured to receive an operation signal, wherein the operation signal is output by an operation controller that is remotely located from the communication device and from the industrial vehicle, a storage portion configured to store a conversion program for converting the operation signal into the remote instruction signal, a communication device communication portion configured to communicate with the vehicle communication portion, and a second signal conversion portion configured to convert the operation signal into the remote instruction signal, the industrial vehicle remote operation program includes instructions for executing, using the communication device, processes of causing the second signal conversion portion to convert the operation signal into the remote instruction signal using the conversion program stored in the storage portion, instructing the communication device communication portion to send the remote instruction signal to the vehicle communication portion, and updating information stored in the storage portion so as to enable addition, deletion, and change of an operation signal that is convertible by the second signal conversion portion.

13. The industrial vehicle remote operation system according to claim 1, wherein the data format of the operation signals output by the different operation controllers is unique to each one of the respective types of operation controllers, and the data format is not dependent on an operation mode or a type of communication system of the operation controller.

14. The industrial vehicle remote operation system according to claim 13, wherein the communication device is a single communication device that is configured to receive operation signals from the plurality of types of operation controllers.

15. The industrial vehicle remote operation system according to claim 1, wherein the communication device includes a display configured to be operated by a user.

* * * * *